(12) United States Patent
Ritchey

(10) Patent No.: US 7,562,639 B2
(45) Date of Patent: *Jul. 21, 2009

(54) METHOD AND APPARATUS FOR PLAYING WITH PET

(76) Inventor: Sharon A. Ritchey, P.O. Box 28726, Scottsdale, AZ (US) 85255

( * ) Notice: Subject to any disclaimer, the term of this patent is extended or adjusted under 35 U.S.C. 154(b) by 153 days.

This patent is subject to a terminal disclaimer.

(21) Appl. No.: 11/657,861

(22) Filed: Jan. 25, 2007

(65) Prior Publication Data

US 2007/0119384 A1    May 31, 2007

Related U.S. Application Data

(63) Continuation-in-part of application No. 11/114,542, filed on Apr. 26, 2005, which is a continuation-in-part of application No. 11/086,028, filed on Mar. 22, 2005, which is a continuation-in-part of application No. 10/213,548, filed on Aug. 6, 2002, now Pat. No. 7,121,230, which is a continuation of application No. 09/951,942, filed on Sep. 10, 2001, now Pat. No. 6,481,381, which is a continuation-in-part of application No. 09/531,708, filed on Mar. 21, 2000, now Pat. No. 6,378,464.

(51) Int. Cl.
  *A01K 29/00* (2006.01)
(52) U.S. Cl. ..................................................... 119/708
(58) Field of Classification Search ................. 119/706, 119/707, 708, 709; 446/227; 231/2.1
See application file for complete search history.

(56) References Cited

U.S. PATENT DOCUMENTS

| 5,755,184 A | * | 5/1998 | Neidenberger | ............... | 119/707 |
| 5,782,207 A | * | 7/1998 | Goodham | .................... | 119/707 |
| 6,378,464 B1 | * | 4/2002 | Ritchey | ....................... | 119/708 |
| 6,883,465 B2 | * | 4/2005 | Telford et al. | ................ | 119/708 |

\* cited by examiner

*Primary Examiner*—Rob Swiatek
(74) *Attorney, Agent, or Firm*—Tod R. Nissle, P.C.

(57) ABSTRACT

A toy for a cat comprises a grouping of feathers, felt, or fleece stitched together with VELCRO fasteners that permit the toy to be safely utilized on a lash, on a stick, or in a roly-poly toy.

4 Claims, 29 Drawing Sheets

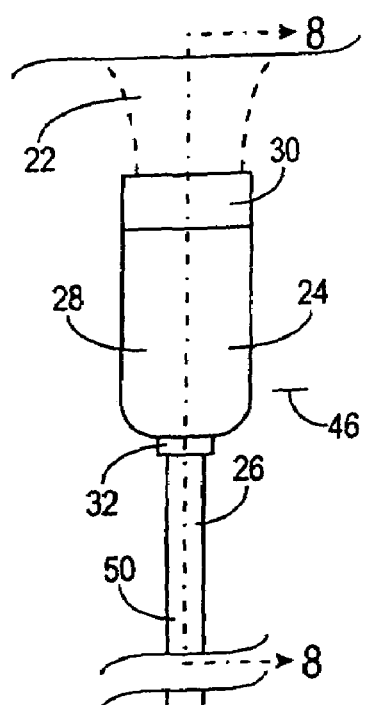
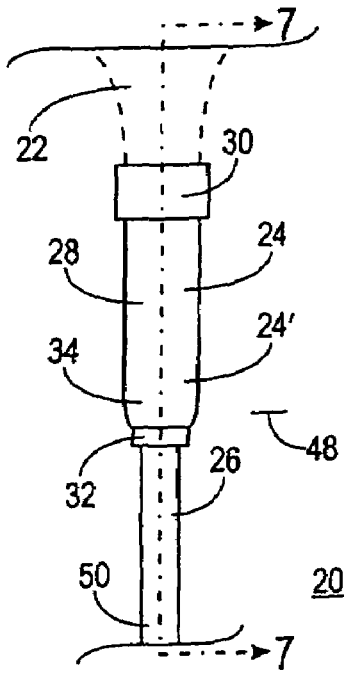
FIG. 2
FIG. 1
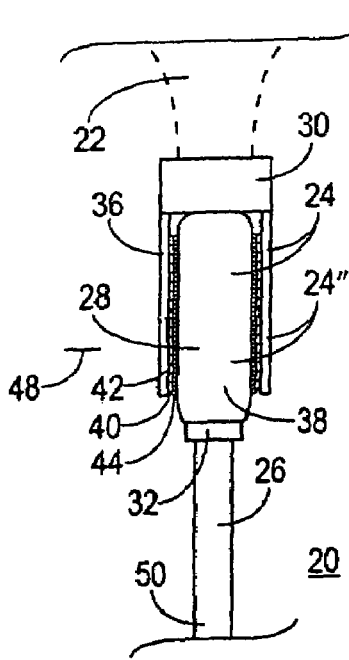
FIG. 3
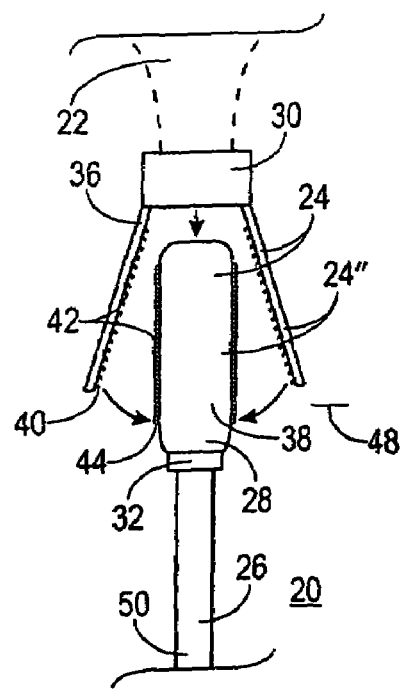
FIG. 4

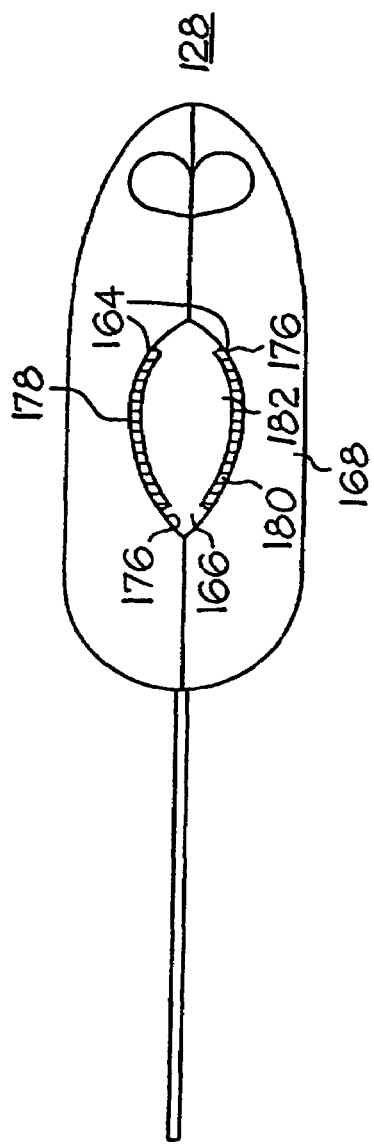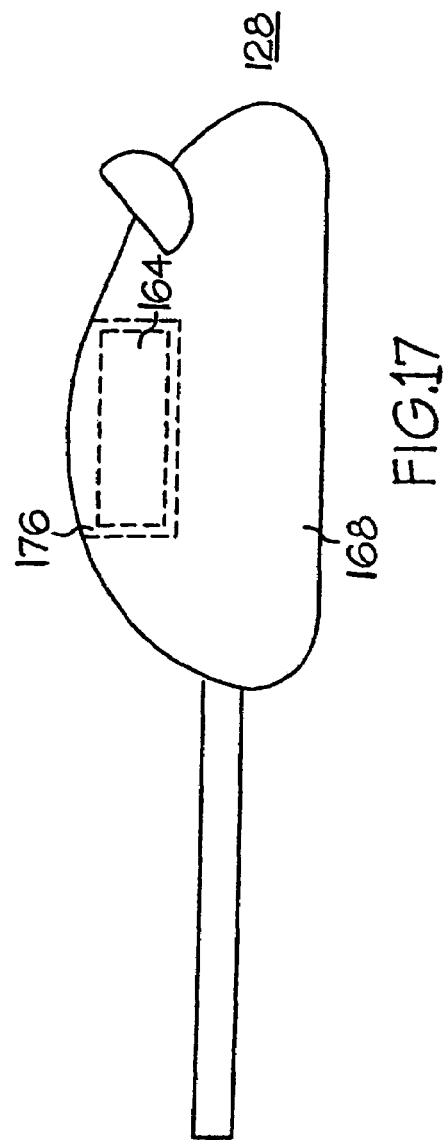
FIG.18
FIG.17

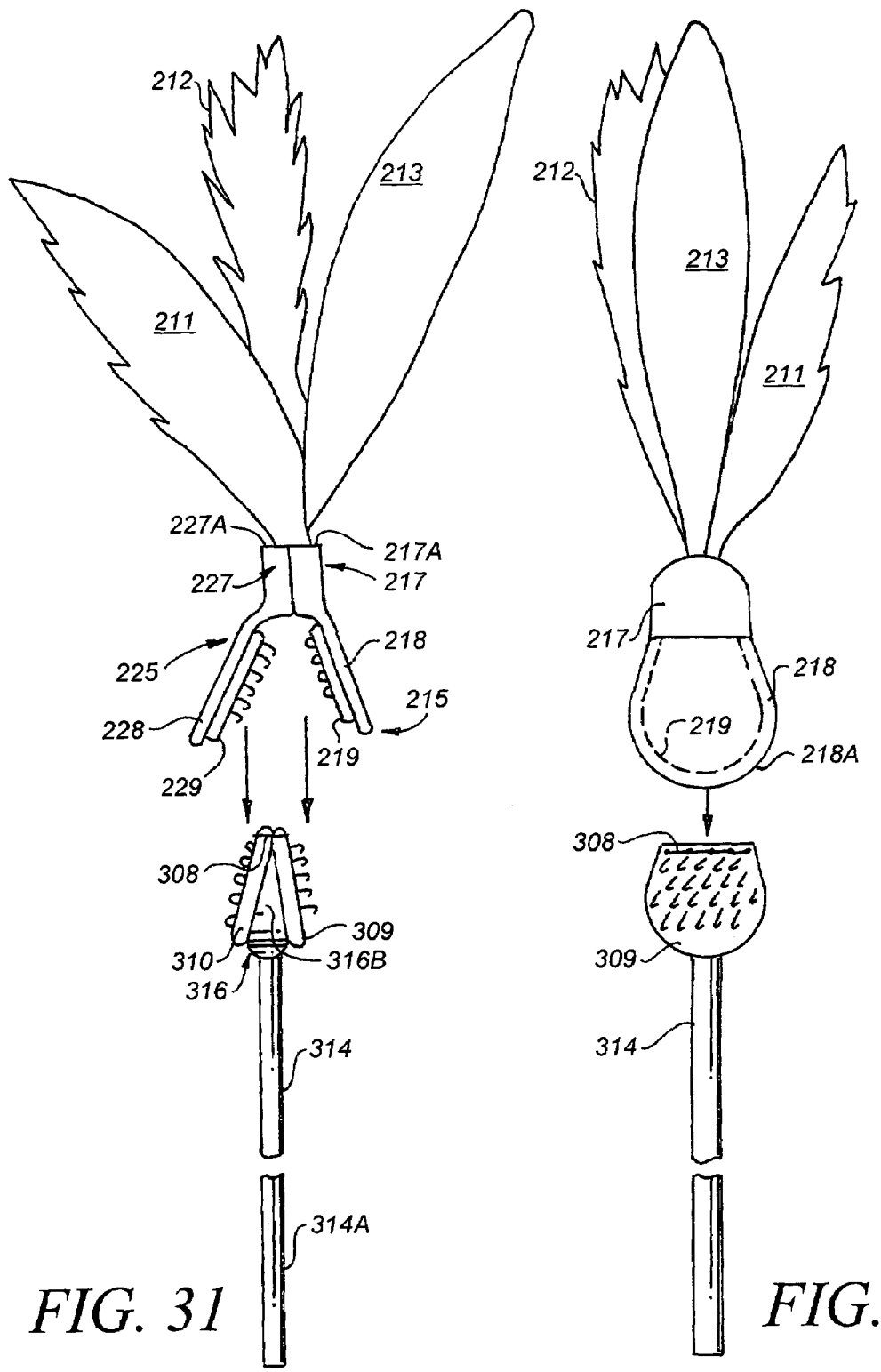

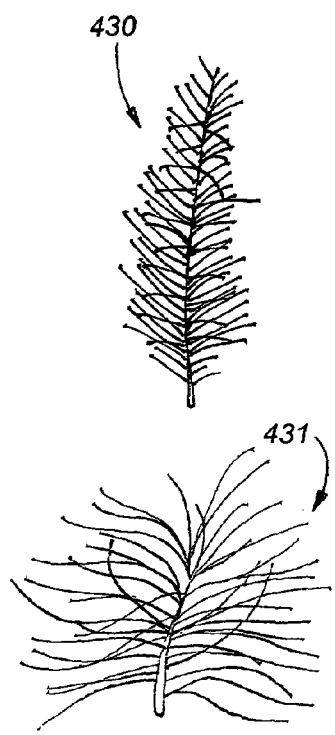
FIG. 43
FIG. 42
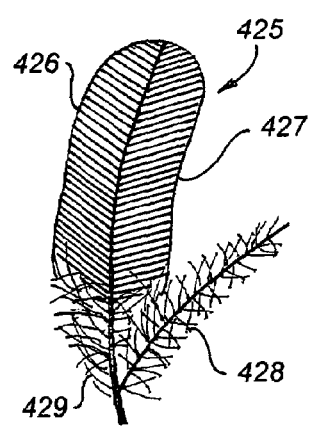
FIG. 41
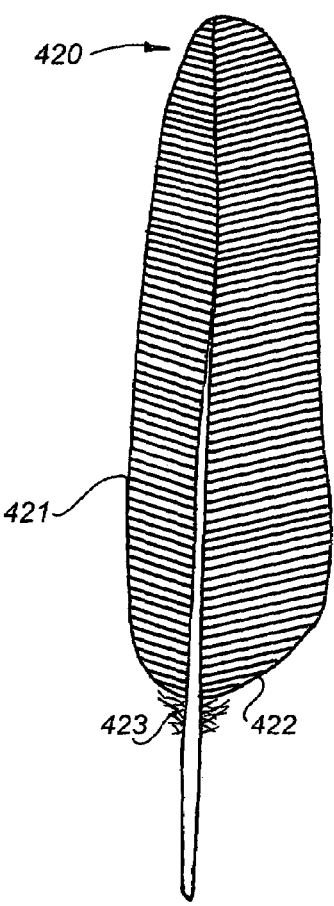
FIG. 40

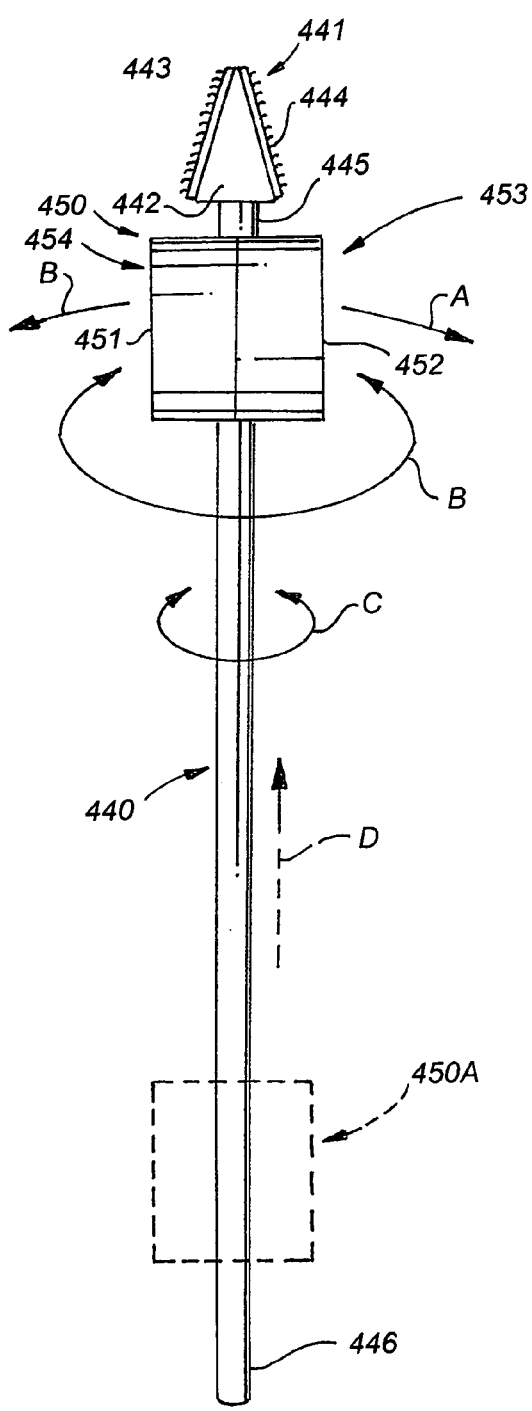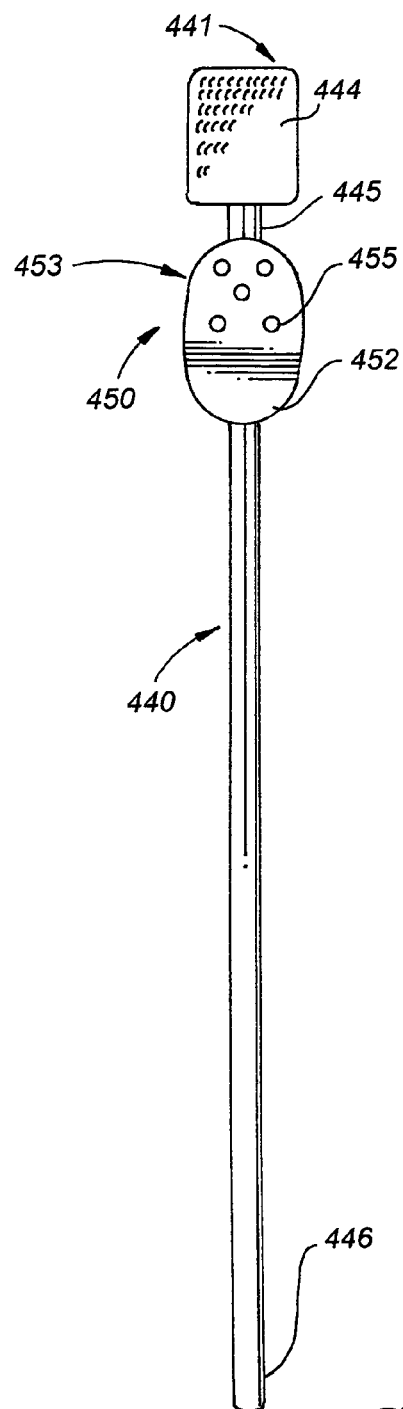
FIG. 45
FIG. 46

```
┌─────────────────────────────────────────┐
│ PROVIDE STICK WITH MOTION-ACTIVATED     │
│ SQUEAKER THAT SLIDES ALONG STICK   470  │
└─────────────────────────────────────────┘
                    │
                    ▼
┌──────────────────────────────────────────────────────┐
│ PLAY WITH CAT BY MOVING STICK TO SIMULTANEOUSLY SLIDE│
│ SQUEAKER ALONG STICK AND ACTIVATE SQUEAKER TO        │
│ PRODUCE SOUND                                    471 │
└──────────────────────────────────────────────────────┘
```

*FIG. 51*

METHOD AND APPARATUS FOR PLAYING WITH PET

This application is a continuation-in-part of U.S. patent application Ser. No. 11/114,542, filed Apr. 26, 2005, which is a continuation-in-part of U.S. patent application Ser. No. 11/086,028, filed Mar. 22, 2005, which is a continuation-in-part of U.S. patent application Ser. No. 10/213,548, filed Aug. 6, 2002, now U.S. Pat. No. 7,121,230, for "PET-PLAY APPARATUS CONFIGURED FOR INTERACTIVE USE", which is a continuation of application Ser. No. 09/951,942, filed on Sep. 10, 2001 now U.S. Pat. No. 6,481,381, which is a continuation-in-part of application Ser. No. 09/531,708, filed on Mar. 21, 2000, now U.S. Pat. No. 6,378,464.

The present invention relates to pet toys. More particularly, the invention pertains to animal toys including a wand and a play object attached to the wand.

Among interactive pet toys, especially those pet toys intended to allow humans to interactively play with their pets, there exists a specific type of pet toy known as a "teaser." In its simplest form, a teaser consists of a want upon an end of which is affixed a play object, A teaser is intended as an interactive toy for cats and other animals that instinctively hunt and pounce upon small prey, such as mice and birds.

A pet owner uses a teaser by grasping and shaking the wand to cause the play object at the outer end of the wand to move. This typically causes a cat or other pet to pounce on or otherwise attack the play object.

The motion of the play object preferably emulates the motion of the pet's natural prey. The natural prey of cats and other similar-sized predators comprise mice, birds, lizards, and the like. It is desirable that the motion of a teaser emulate the movements of one or more of such small prey animals. Such emulation triggers instinctive responses and produces optimal interactive play for both the pet owner and the pet.

The natural movement of small prey typically consists of relatively rapid short smooth motions and very rapid jerky motions. These motions are produced as the prey changes location and moves in place, respectively. In order to emulate these motions, a pet owner moves the teaser wand so the play object moves relatively rapidly over a broad area while quickly jerking about.

The play object is typically firmly affixed to the end of the wand. In this case, emulation of both the broader and the quicker motions is dependent on the movement imparted to the wand by the pet owner. Excessive, complex, and tiring wrist action tends to be required to produce maximum stimulation of a cat or other pet.

In other cases, the play object is loosely attached to the end of the wand. In such cases, it is intended that the wand impart the desired broader movements, while the movement of the play object at the end of the wand impart the quicker emulating movements. A play object that is loosely attached to the end of a wand tends, however, to flop. Flopping is, at best, a poor emulation of the quicker movements of prey animals and suggest to a pet a diseased or injured prey animal. Many hunting animals instinctively avoid sick prey. A loosely attached, floppy play object therefore often is not desirable.

The desired dual-action motion of the play object is achieved through use of a spring teaser. In a spring teaser, the play object is attached to a spring or wire. A spring teaser permits a human to impart broader motions by manipulating the wand. The spring imparts quicker motions and causes the play object to bob about. One limitation of a spring teaser is lack of control. It is not possible for a pet owner to determine where the play object will be at any given time. The spring permit the play object to bob about in a variety of directions. Such lack of control can result in the play object striking a pet unexpectedly.

It would be desirably, therefore, to provide an improved teaser that would enable a pet owner to use the wand to impart controlled broad and quick movements to a play objects at the end of the wand.

Accordingly, it is an object of the present invention to provide a pet toy that can be manipulated to control the movement of a play object comprising a part of the toy.

Another object of the invention is to provide an improved pet toy that couples a play object to the end of a wand.

Still a further object of the invention is to provide an improved cat toy with a sound producing module that can be readily mounted on and removed from the toy.

Still another object of the invention is to provide an improved cat toy that can be reconfigured to facilitate maintaining a cat's interest in the toy for an extended period of time.

The foregoing and other objects of the invention are carried out in one form by a pet toy comprising a play object having an object axis; a wand having a wand axis at an intersection of a first plane and a second plane; and a flexible coupling affixed to the play object, affixed to the wand, and configured so that the object axis may freely pivot no more than plus or minus forty-five degrees relative to the wand axis in the first plane.

In another embodiment of the invention, a pet toy includes a play object coupled to a wand such that movement of the play object is limited to no more than plus or minus forty-five degrees relative to the wand in a first plane, and is limited to no more than plus or minus thirty degrees relative to the wand in a second plane that is substantially perpendicular to the first plane.

In a further embodiment of the invention, I provide a lightweight, pliable, flexible cat toy comprising at least one plume having a lower end; a piece of fabric attached to said lower end; and, a piece of hook-and-loop fastening material attached to said piece of fabric.

In still another embodiment of the invention, I provide an improved play toy for a cat. The toy comprises an elongate pliable stick having a handle end and a toy attachment end; a head having a peripheral edge, attached to the toy attachment end, and shaped and dimensioned to extend laterally outwardly from the stick; hook-and-loop fastening material mounted on and extending around the head; and, stitching fastening the hook-and-loop material on the head and extending through the hook-and-loop material adjacent the peripheral edge of the head.

In still a further embodiment of the invention, I provide an improved self-righting play apparatus for a cat. The apparatus includes an arcuate, open, hollow base having a selected weight, a wall with an inner surface and an outer surface, an upper lip connected to the wall, an arcuate bottom, and center of gravity. The base has at least two operative positions, a first upright orientation with the arcuate bottom contacting a horizontally oriented support surface and with the upper lip spaced apart from the support surface; and, a second tipped orientation with the base tipped over such that the upper lip contacts the support surface. The center of gravity of the base is located within the base below the upper lip when the base is in the upright orientation. The wall has generally equivalent thickness throughout. The toy apparatus includes hook-and-loop fastening material mounted on the inner surface of the wall; and, includes a lightweight, pliable, flexible cat toy having a selected weight less than the weight of said base. The cat toy comprises a plume having a lower end and including at least one of a pair comprising at least one feather selected from a group consisting of a group consisting of body feathers, semiplume feathers, and down feathers; and, at least one elongate member fabricated from non-fraying fabric. A piece of pliable non-fraying fabric is attached to the lower end of the plume. A piece of hook-and-loop fastening material attached to the piece of fabric and to the hook-and-loop fastening material on the inner surface of the base. The center of gravity of the toy apparatus is located within the base below the upper lip when the base is in the upright orientation. The toy apparatus self-rights when the base is in the second tipped orientation.

In yet another embodiment of the invention, I provide an improved lightweight, pliable, flexible cat toy. The toy comprises a plume having a plurality of feathers selected from a group consisting of body feathers, semiplume feathers, and down feathers; a piece of non-fraying pliable fabric having an upper portion attached to the lower end and having a lower portion in hinged relationship to the upper portion; and, a piece of hook-and-loop fastening material attached to the lower portion.

In yet a further embodiment of the invention, I provide an improved play apparatus for a cat. The apparatus comprises an elongate stick having a handle end and a toy attachment end; a squeaker unit mounted on the stick for slidable movement here along; and, a toy connected to the toy attachment end.

In yet still another embodiment of the invention, I provide an improved play apparatus for a cat. The play apparatus comprises an elongate stick having a handle end; a cat interaction unit mounted on the stick for slidable movement therealong and including motion activated apparatus to produce in response to movement of the unit at least one sensory response from the group consisting of a sound, a scent, and a visible signal.

In yet still a further embodiment of the invention, I provide an improved play apparatus for a cat. The play apparatus comprises an elongate stick having a handle end and a toy attachment end; a motion-activated squeaker unit mounted on the stick, the unit generating sound when activated; and, a toy connected to the toy attachment end. The squeaker unit is activated by motion in at least a first direction without being activated by motion in at least one direction other than the first direction.

In an additional embodiment of the invention, I provide an improved method to make a pet play apparatus for interactive use with a pet. The method comprising the steps of providing a lash having a first end and a second end; providing a first hook and loop fastener affixed to the second end of the lash and comprising a least one of a pair consisting of a hook part, and a loop part; providing a toy; providing a second hook and loop fastener affixed to the toy and comprising at least one of a pair consisting of a hook part, and a loop part; and, detachably securing the second hook and loop fastener to the first hook and loop fastener. The first and second hook and loop fasteners can be made at least in part from fabric. The lash can be made at least in part from fabric.

A more complete understanding of the present invention may be derived by referring to the detailed description and claims when considered in connection with the drawings, wherein like reference numbers refer to similar items through the several view and comprising:

FIG. 1 shows a plan view of a pet toy having a play object, a flexible coupling, and a wand in accordance with a preferred embodiment of the present invention;

FIG. 2 shows a side view of a pet toy demonstrating a one-piece flexible coupling in accordance with a preferred embodiment of the present invention;

FIG. 3 shows a side view of a pet toy demonstrating a two-piece flexible coupling in accordance with a preferred embodiment of the present invention;

FIG. 4 shows a side view of a pet toy demonstrating attachment and detachment of the two-piece flexing coupling of FIG. 3 in accordance with a preferred embodiment of the present invention;

FIG. 17 depicts a side view of the toy of FIG. 5 in accordance with an embodiment of the present invention;

FIG. 18 depicts a top view of the toy of FIG. 5 showing an attachment device within an opening in accordance with a preferred embodiment of the present invention;

FIG. 31 is a front view illustrating the light-weight cat toy of FIG. 27 being mounted on the stick of FIG. 30;

FIG. 32 is a side view further illustrating the light weight cat toy of FIG. 27 being mounted on the stick of FIG. 31;

FIG. 40 is a front view illustrating one kind of contour feather, namely, a flight feather having a generally asymmetrical pennaceous portion;

FIG. 41 is a front view illustrating another kind of contour feather, namely a body feather having a generally symmetrical pennaceous portion;

FIG. 42 is a front view illustrating a down feather;

FIG. 43 is a front view illustrating a semiplume feather;

FIG. 45 is a side elevation view illustrating an alternate embodiment of the invention;

FIG. 46 is a front elevation view illustrating the invention of FIG. 45;

FIG. 51 is a block flow diagram illustrating a further method of utilizing the toy of FIG. 45;

Figure 5:
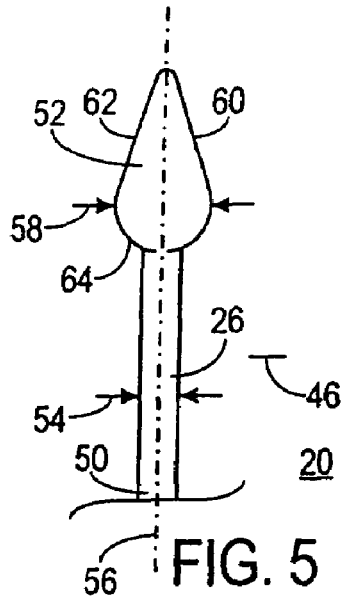
FIG. 5 shows a plane view of a wand for a pet toy in accordance with a preferred embodiment of the present invention.

FIGS. 1, 2, 3, and 4 show a plan view (FIG. 1) and side views (FIGS. 32, 3, and 4) of a pet toy 20 having a play object 22, a one-piece (FIG. 2) or two-piece (FIGS. 3 and 4) flexible coupling 24, and a wand 26 in accordance with a preferred embodiment of the present invention. The following discussion refers to FIGS. 1, 2, 3, and 4.

Pet toy 20 is a "teaser", i.e., pet toy 20 consists of wand 26 with play object 22 attached. Play object 22 is attached to wand 26 by flexible coupling 24. Coupling 24 is configured to impart a controlled movement to play object 22 relative to wand 26 as discussed hereinafter.

In the drawings, the play object is depicted generally by dashed lines 22. The play object can comprise any of a variety of objects including, without limitation, a ball, a stuffed object, a catnip container, a feather, a cluster of feathers, tinsel, a cluster of synthetic tinsel, yarn, a cluster of yarn, string, or a cluster of string.

In one preferred embodiment, pet toy 20 is produced by coupling play object 22 to wand 26 via flexible coupling 24. Flexible coupling 24 has a flexible coupling body 28. Body 28 is desirably affixed to play object 22 by an object collar 30 and is affixed to wand 26 by a wand collar 32.

Flexible coupling 24 presently preferably, but not necessarily, is formed of a fabric to allow coupling 24 to flex freely during use. The use of fabric also tends to reduce the cost of assembly and manufacture. Materials other than fabric can be utilized to fabricate coupling 24.

Collars 30 and 32 function to attach flexible coupling 24 to play object 22 and wand 26. It is not necessary that collards 30 and 32 be flexible. Collard 32 is presently preferably affixed to wand 26 with an adhesive (not shown). The adhesive can saturate collar 32 and make a portion or all of collar 32 rigid and inflexible. Collars 30 and 32 are components of coupling 24 but need not be integral to body 28. In an alternate embodiment (not shown) of the invention, collar 32 is a ring clip or other clamping device configured to securely affix body 28 to wand 26. The construction of collars 30 and 32 can vary as desired.

Coupling 24 may be a one-piece flexible coupling 24' (FIG. 2), or a two-piece flexing coupling 24" (FIGS. 3 and 4). When coupling 24 comprises a one-piece coupling 24', body 28 consists of an object-wand connector 34 between collar 30 and collar 32. Connector 34 forms a substantially permanent flexible connection between play object 22 and wand 26.

Alternatively, when coupling 24 is two-piece flexible coupling 24", the coupling body consists of an object connector 36 substantially permanently affixed to play object 22 and a wand connector 38 substantially permanently affixed to wand 26. Object connector 36 is configure to detachable couple to wand connector 38. In the embodiment of FIGS. 3 and 4, this is accomplished by incorporating into object connector 36 a first portion 40 of a hook-and-loop connector 42, and by incorporating into wand connector 38 a second portion 44 of hook-and-loop connector 42. First and second portions 40 and 44 of hook-and-loop connector 42 are configured to engage each other, as demonstrated in FIG. 4, to detachably couple play object 22 to wand 26.

Connectors other than hook-and-loop connector 42 can be used to form two-piece flexible coupling 24".

Use of two-piece flexible coupling 24" is preferred over one-piece flexible coupling 24'. Two-piece coupling 24" permits the use of multiple play objects 22 on a single wand 26. For the sake of simplicity and clarity, however, one-piece coupling 24' referred to simply as flexible coupling 24, will be utilized for the remainder of this discussion except when specifically indicated otherwise.

FIGS. 1, 5, 7, and 9 are plane or "top" views. FIGS. 2, 3, 4, 6, 8, and 10 are side views. FIGS. 1, 5, 7, and 9 depict pet toy 20 and/or wand 26 in a plan plane 46. FIGS. 2, 3, 4, 6, 8, 10 depict pet toy 20 and/or wand 26 in a side plane 48 that is substantially perpendicular to the plan plane 46.

Figure 6:
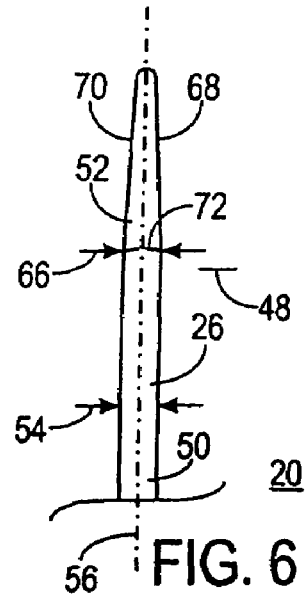
FIG. 6 shows a side view of a wand for a pet toy in accordance with a preferred embodiment of the present invention.

FIGS. 5 and 6 show a plan view (FIG. 5) and a side view (FIG. 6) of wand 26 for pet toy 20 in accordance with a preferred embodiment of the present invention. The following discussion refers to FIGS. 1, 2, 5, 6.

Wand 26 includes a wand shaft 50. Shaft 50 includes head 52. Shaft 50 is presently preferably, but not necessarily, cylindrical. Shaft 50 has a diameter 54. Axis 56 extends longitudinally through the center of shaft 50 at the intersection of the plan plane 46 and side plane 48.

Wand head 52 is preferably asymmetrical relative to wand axis 56. In plan plane 46 (FIG. 5), wand head 52 preferably, but not necessarily, has a base width 58 that is substantially wider than shaft diameter 54. Wand head 52 is preferably formed in plan plane 46 with a shape incorporating a first plan-plane head side 60 and a second plan-plane head side 62. Head sides 60 and 62 are desirably straight, though this is not a requirement of the present invention.

Plan-plane head sides 60 and 62 comprise two sides of a modified triangle. Head 52 has a plan-plane base 64 whose width is base width 58. Base 64 is a tangential arcuate base flowing smoothly into head sides 60 and 62. This gives wand head 52 a "spade" shape in horizontal plane 46, which shape has certain advantages.

Wand head 52 may have a shape in plan plane 46 other than that of a modified triangle.

In side plane 48 (FIG. 6), wand head 52 has a base thickness 66 substantially equal to shaft diameter 54. Wand head 52 is formed in side plane 48 with a shape incorporating a first side-plane head side 68 and a second side-plane head side 70. Head sides 68 and 70 are straight.

Side-plane head sides 68 and 70 are two sides of a modified triangle. Wand head 52 has a side-plane base 72 whose thickness is head base thickness 58, i.e., is equal to the shaft diameter 54. This gives wand head 52 a wedge shaped in side plane 48.

Wand head 52 can have a shape in side plane 68 other than that of a modified triangle.

Figure 7:
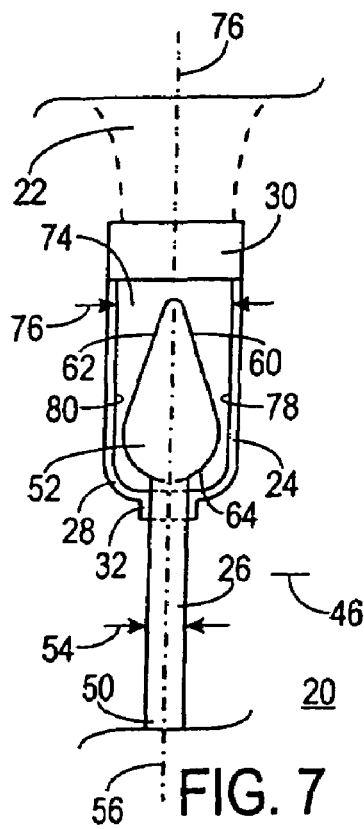
FIG. 7 shows a cross sectional plan view of a pet toy taken at line 7-7 of FIG. 2 and demonstrating a wand head encompassed with a coupling pocket in accordance with a preferred embodiment of the present invention.
Figure 9:
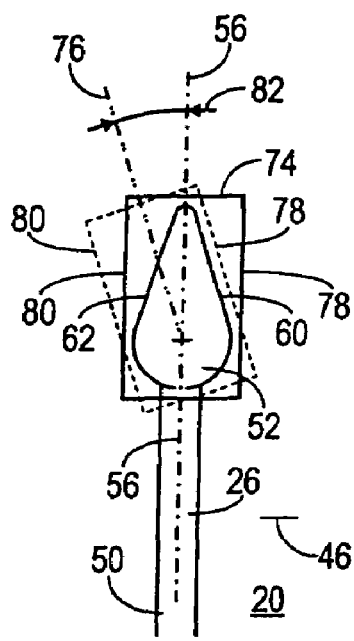
FIG. 9 shows a schematic view demonstrating controlled movement in a first plane of a coupling pocket relative to a wand head in accordance with a preferred embodiment of the present invention.
Figure 8:
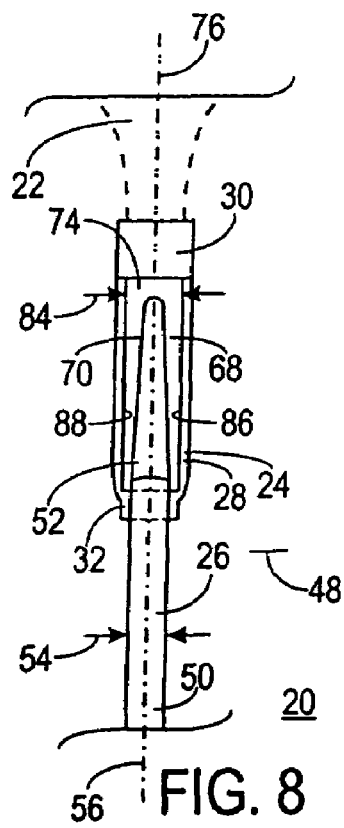
FIG. 8 shows a cross sectional side vie2 of a pet toy taken at line 8-8 of FIG. 1 and demonstrating a wand head encompassed with a coupling pocket in accordance with a preferred embodiment of the present invention.
Figure 10:
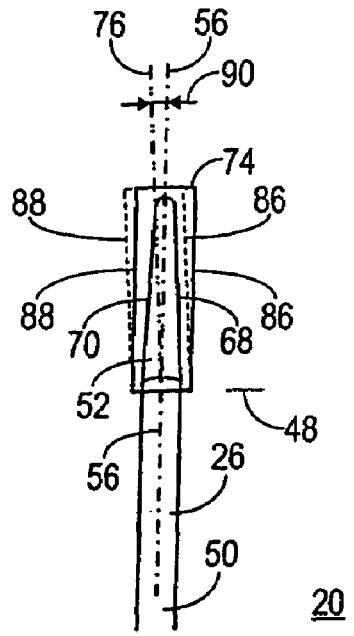
FIG. 10 shows a schematic view demonstrating controlled movement in a second plane of a coupling pocket relative to a wand head in accordance with a preferred embodiment of the present invention.

FIGS. 7 and 8 show cross sectional plan and side views of pet toy 20 taken along section lines 7-7 and 8-8 of FIGS. 2 and 1, respectively, and demonstrating wand head 52 encompassed with a coupling pocket 74 in accordance with an embodiment of the invention. FIGS. 9 and 10 show views of FIGS. 7 and 8, respectively, and demonstrating controlled movement of coupling pocket 74 relative to wand head 52. The following discussion refers to FIGS. 1, 2, 5 to 10.

Flexible coupling 24 is affixed to play object 22 and wand 26 via object and wand collars 30 and 32. Play object 22 may be aligned so that an object axis 76 extending through a nominal center (not show) of play object 22 aligns with wand axis 56. In this discussion, such an alignment is an arbitrary "rest condition", and is the condition depicted in FIGS. 1, 2, 7, 8. When in this arbitrary rest condition, object axis 76 and wand axis 56 are both at the intersection of plane and side planes 46 and 48.

Coupling body 28 is hollow. Coupling pocket 74 is an internal pocket formed or inserted in coupling body 28, i.e., withing flexible coupling 24. The materials used to form pocket 74 can vary as desired. Pocket 74 can be formed as an insert to be placed in coupling 24. When flexible coupling 24 is affixed to wand 26, head 52 is inside pocket 74 and collar 32 is affixed to shaft 50 proximate head 52.

Coupling pocket 74 is asymmetric relative to object axis 76. In plan plane 46 (FIG. 7), coupling pocket 74 has a pocket width 76 greater than base width 58. Coupling pocket 74 is formed in plan plane 46 with a shape incorporating a first plan-plane pocket side 78 and a second plan-plane pocket side 80. Pocket sides 78 and 80 are straight.

Pocket 74 is formed so that when wand head 52 if in coupling pocket 74 and coupling 24 is deflected in plan plane 46 (FIG. 9) so that one of pocket sides 78 and 80 is substantially parallel with one of head sides 60 and 62, the other of pocket sides 78 and 80 is not parallel with the other of head sides 60 and 62. This is accomplished by formed coupling pocket 74 so that plan plane sides 78 and 80 are two opposing sides of a modified triangle.

Pocket 74 can have a shape in plan plane other than that of a modified rectangle. For example, if wand head 52 has the shape of a modified rectangle, the pocket 74 can have the shape of a modified trapezoid to achieve the same ends. Any given set of functional shapes for wand head 52 and coupling pocket 74 may be used without departing from the spirit of the invention.

If pocket 74 is formed so pocket side 78 is substantially parallel with head side 60 and pocket side 80 is not parallel with head side, then play object 22 is able to pivot relative to wand 26 in plan plane 46. Further, object axis 76 can freely pivot through a predetermined plan plane pivot angle 82 in plan plane 46 relative to wand axis 56 (FIG. 9). Coupling pocket 74 is configured relative to wand head 52 so that object axis 76 can pivot at least plus or minus ten degrees and not greater than plus or minus forty-fives relative to wand axis 56. Movement of play object 22 relative to wand 26 is therefore at least plus or minus ten degrees, but limited to plus or minus forty-five degrees in plan plane 46.

By forming wand head 52 in a "spade" shape, i.e., as a modified isosceles triangle having a tangential arcuate base, wand collar 32 may be affixed to wand shaft 50 closely proximate wand head 52. This allows a greater freedom of movement of coupling pocket 74 with a reduction of material and cost for flexible coupling 24. Shapes other than the spade shape can be utilized for wand head 52.

In side plane 48 (FIG. 8), coupling pocket 74 desirably has a pocket thickness 84 greater than base thickness 66. Coupling pocket 74 is also desirably formed in side plane 48 with a shape incorporating a first side-plane pocket side 86 and a second side-plane pocket side 88. Pockets sides 86 and 88 are straight.

Pocket 74 is formed so that when wand head 52 is encompassed in pocket 74 and coupling 24 is deflected in side plane 48 (FIG. 10) so that one of pocket sides 86 and 88 is substantially parallel with one of head sides 68 and 70, the other of pocket sides 86 and 88 is not parallel with the other of head sides 68 and 70. This is accomplished by forming pocket 74 so that side-plane sides 86 and 88 are tow opposing sides of a modified rectangle.

Pocket 74 can have a shape in side plane other than that of a modified rectangle. Ang given set of functional shapes for head 52 and pocket 74 can be used.

Pocket 74 is formed so that—when pocket side 86 is substantially parallel to head side 68—pocket side 88 is not parallel to head 70, enables play object 22 to pivot relative to wand 26 in side plane 48. This enables object axis 76 to freely pivot through a predetermined side plane pivot angle 90 in plane 48 relative to wand axis 56 (FIG. 10). Coupling pocket 74 is configured relative to wand head 52 so that object axis 76 pivots at least plus or minus five degrees and not greater than plus or minus thirty degrees relative to wand axis 56. Movement of play object 22 relative to wand 26 is therefore at least plus or minus five degrees but no more than plus or minus thirty degrees in side plane 48.

Forming head 52 in a spade shape (i.e., as a modified isosceles triangle having a tangential arcuate base) in side plane 48, enables wand collar 32 to be affixed to wand shaft 50 proximate wand head 52. This allows a greater freedom of movement of coupling pocket 74 with a reduction of material and cost for coupling 24. Head 52 can be constructed in shapes other than a spade shape.

Allowing play object 22 movement relative to wand 26 of at least plus or minus ten degrees in plan plane 46 and plus or minus five degrees in side plane 48, and limiting the movement to no more than plus or minus forty-five degrees in plan plane 46 and not more than thirty degrees in side plane 48, enables play toy 20 to be manipulated by a play owner to produce broad prey motions with gross movement of wand 26 while simultaneously emulating short, quick prey movements through the restricted independent movements of play object 22 on the end of wand 22.

The following discussion refers to FIGS. 1, 3, 4, 7, 8.

When pet toy 20 is produce with two-part flexible coupling 24", it is desirable that coupling pocket 74 be integral to wand connector 38, rather than object connector 36. This construction provides a maximum of flexibility in that a plurality of play objects 22 can be utilized with a single wand 22 and its associated coupling pocket. Being able to readily interchange on wand 22 multiple play objects enables the configuration of the wand to be readily altered. If one play object wears out, another may be readily substituted on wand 22.

Figure 11:
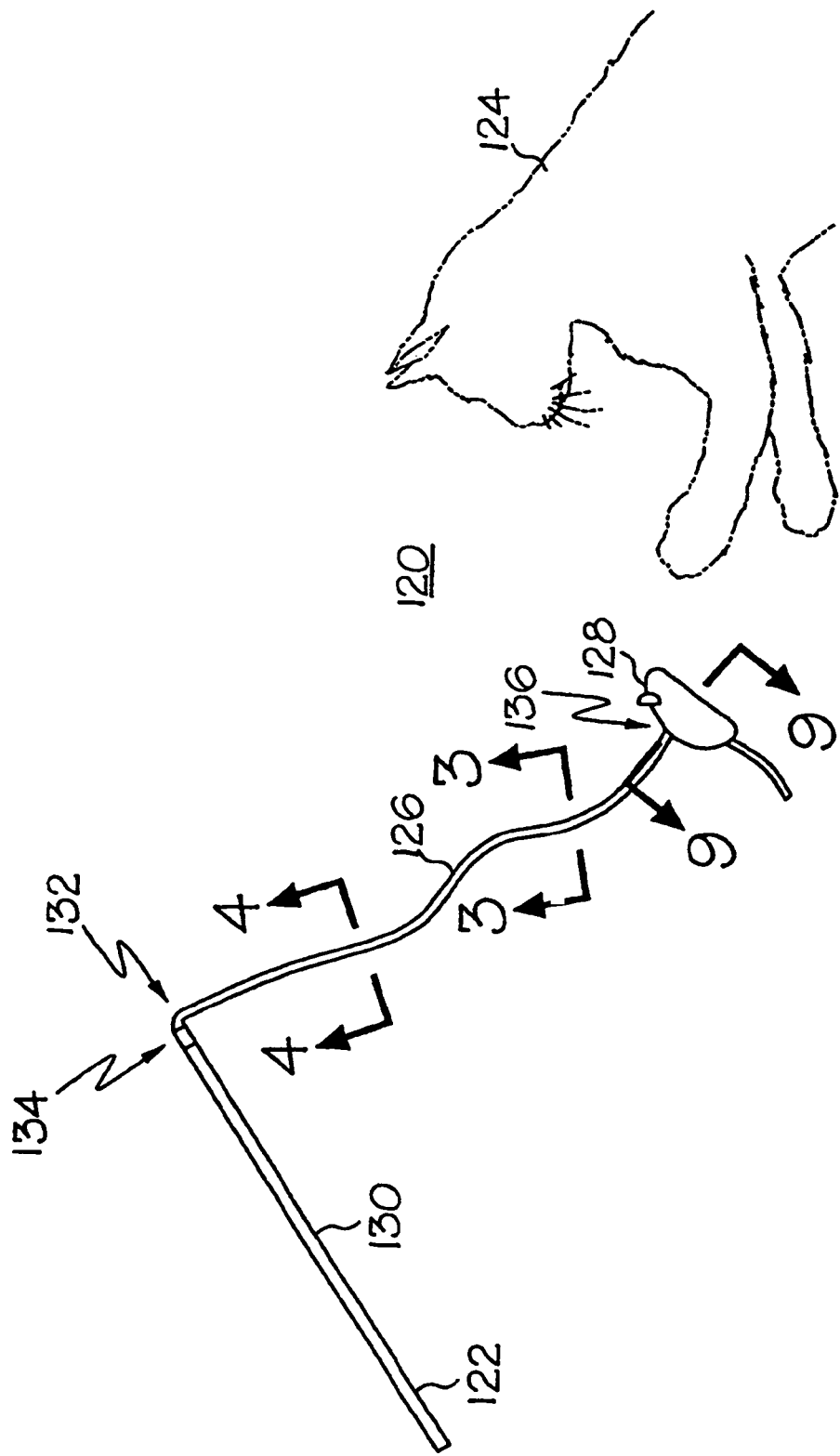
FIG. 11 depicts a pet-play apparatus having a wand-shaped crop in interactive use with a pet in accordance with a preferred embodiment of the invention.
Figure 12:
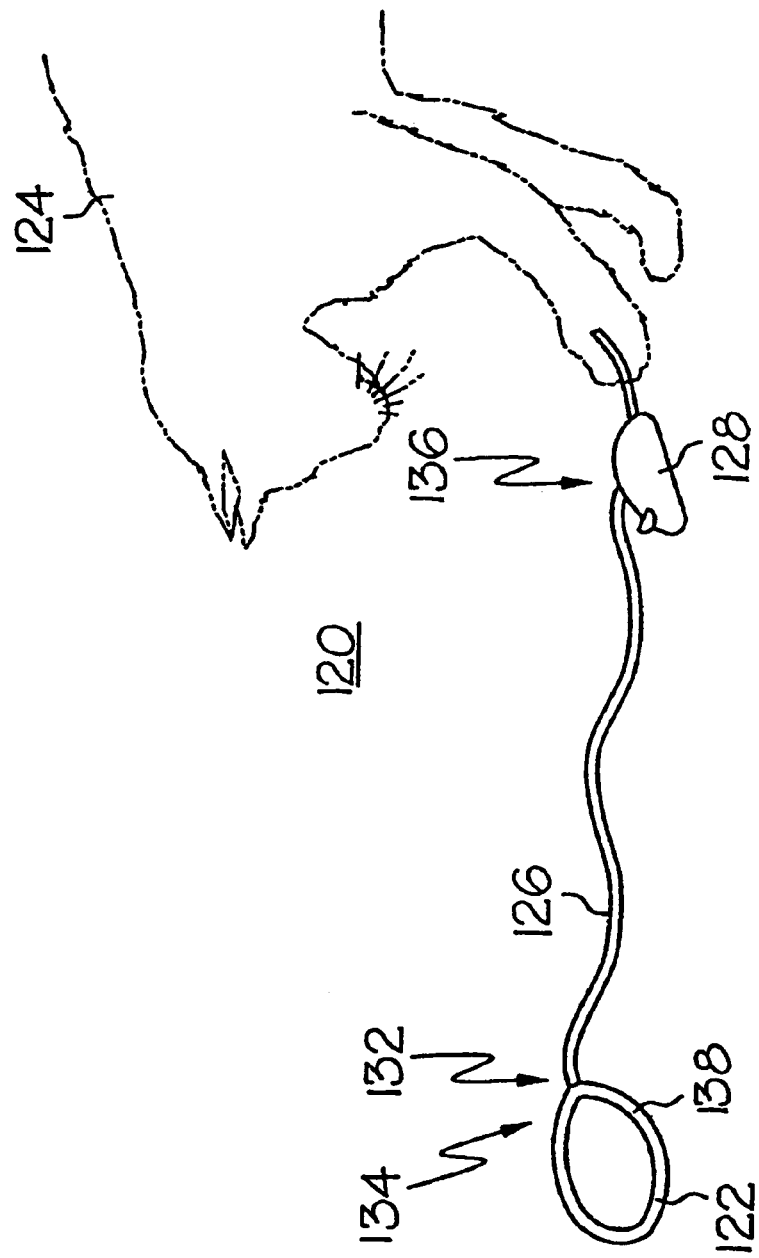
FIG. 12 depicts a pet-play apparatus having a loop-shaped crop in interactive use with a pet in accordance with an alternative preferred embodiment of the invention.

FIGS. 11 and 12 depict a pet-play apparatus 120 having a wand-shaped crop 122 (FIG. 11) or a loop-shaped crop 122 (FIG. 12) in interactive use with a pet 124 in accordance with a preferred embodiment of the present invention.

Pet-play apparatus 120 is a whip-type apparatus, which includes crop 122, a lash 126, and a toy 128. Crop 122 is typically a wand 130 (FIG. 11), allowing interactive use in a "fishing-pole" manner. One end (a crop end) 132 of lash 126 is affixed to an end 134 of crop 122. Toy 128 is suspended from and coupled to another end (a dangling end) 36 of lash 26. When crop 22 is held in an appropriate position, toy 128 may be made to dangle in front of pet 124. Suitable movements of crop 122 will cause toy 128 to bobble, bounce, wiggle, scoot across the floor, and otherwise move to attract the attention of pet 124. Toy 28 may therefore be made to move in a manner simulating prey. This stimulates the hunting and pouncing instincts of pet 124 and provides activity and play for both pet 124 and its playmate (i.e., the person in control of crop 122).

Alternatively, crop 22 may be formed into a loop 138 (FIG. 12) for interactive use in a dragging manner. While the movements of toy 28 may be reduced somewhat in this embodiment, other types of play are enhanced, including play by small children for whom wand 130 (FIG. 11) may be undesirable. This embodiment has an added benefit in that loop 138 may be placed over a protrusion (such as a doorknob) so as to leave toy 128 dangling and provide solo use by pet 124. Loop 138 may be fabricated so as to be contiguous with lash 126. Lash 126 is desirably formed of non-metallic and non-string-like materials resistant to being severed by chewing and formed to inhibit entanglement. Similarly, toy 128 is attached to lash 26 by a fastener or fasteners made of nonmetallic materials not assuming the form of a ring, clip, button or the like. All such materials for either lash 126 or toy 128 are non-toxic and do not produce toxic substances in the presence of digestive fluids. Such materials are soft enough to not damage the teeth, gingiva, or other mouthparts of pet 124. Toy 128 should be readily detachable from lash 126 for independent (solo) use by pet 124, yet easily re-attachable for interactive use.

Figure 14:
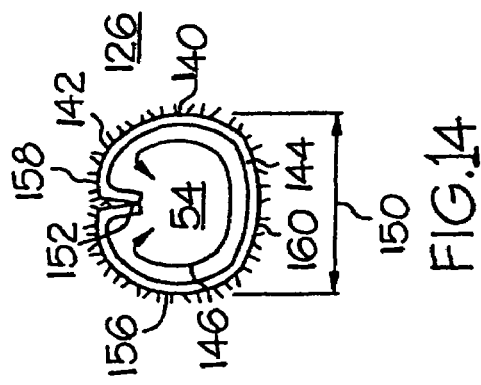
FIG. 14 depicts a cross-sectional view of a lash of the pet-play apparatus of FIG. 1 wherein the lash is a tube of fabric in accordance with a second preferred embodiment of the present invention.
Figure 13:
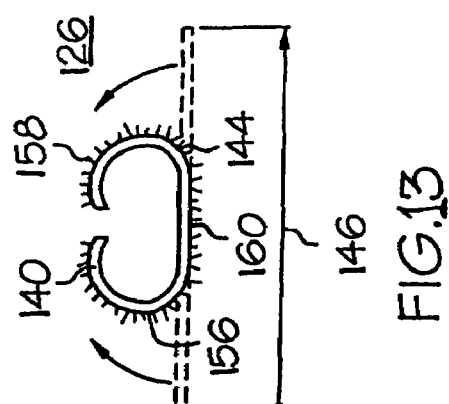
FIG. 13 depicts a cross-sectional view of a lash of the pet-play apparatus of FIG. 1 wherein the lash is a strip of fabric in accordance with a first preferred embodiment of the invention.

FIGS. 13 and 14 depict a cross-sectional view of lash 126 of pet-play apparatus 120, wherein lash 26 is a strip 140 (FIG. 13) or a tube 142 (FIG. 4) of fabric 44 in accordance with preferred embodiments of the present invention.

The following discussion refers to FIGS. 1, 3, 4.

In a first preferred embodiment (FIG. 13), lash 126 is formed of strip 140 of fabric 144. Strip 140 has a width 146 and a length 148 (FIG. 16) substantially greater than width 146. Length 148 substantially defines an overall length of lash 26.

If cut across the warp, i.e., along the weft, of fabric 144, strip 140 will tend to curl in the direction of width 146 into a tube-like shape. This provides a thinner, more tail-like appearance for lash 26 that ins provided by a flat strip 140. This tail-like shape is more attractive to pet 124 while simultaneously increasing the life of lash 126 by inhibiting unralveling of fabric 144 when chewed by pet 124.

In a second preferred embodiment (FIG. 14), strip 140 is sewn into a tube 142 of a diameter 150 and length 148 (FIG. 6) substantially greater than diameter 150. For cosmetic purposes, tube 142 may be turned inside out (i.e., a sewn seam 152 may be placed on an inside 154 of tube 142). By being so formed, lash 126 has a more tail-like appearance and more effectively prevents unraveling.

In the preferred embodiments, fabric 144 is a fake fur 156 with a nap 158 on the outside of the curl of strip 140 (FIG. 13) or on an external surface 160 of tube 142 (FIG. 14). This increases the tail-like appearance of lash 126.

Figure 15:
FIG. 15 depicts a toy detached from the pet-play apparatus of FIG. 1 in solo use by a pet in accordance with a preferred embodiment of the present invention.
Figure 16:
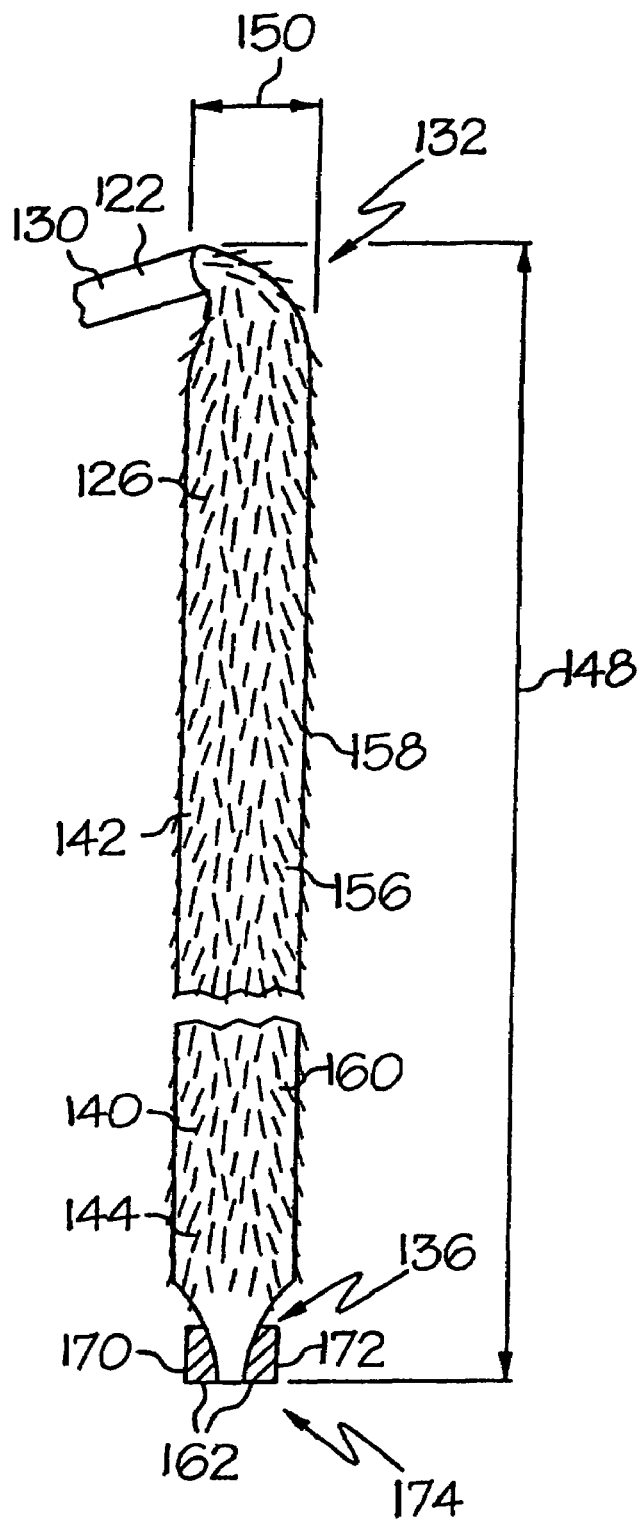
FIG. 16 depicts a side view of a portion of a lash of the pet-play apparatus of FIG. 1 shown an attachment device affixed to the lash in accordance with a preferred embodiment of the present invention.
Figure 19:
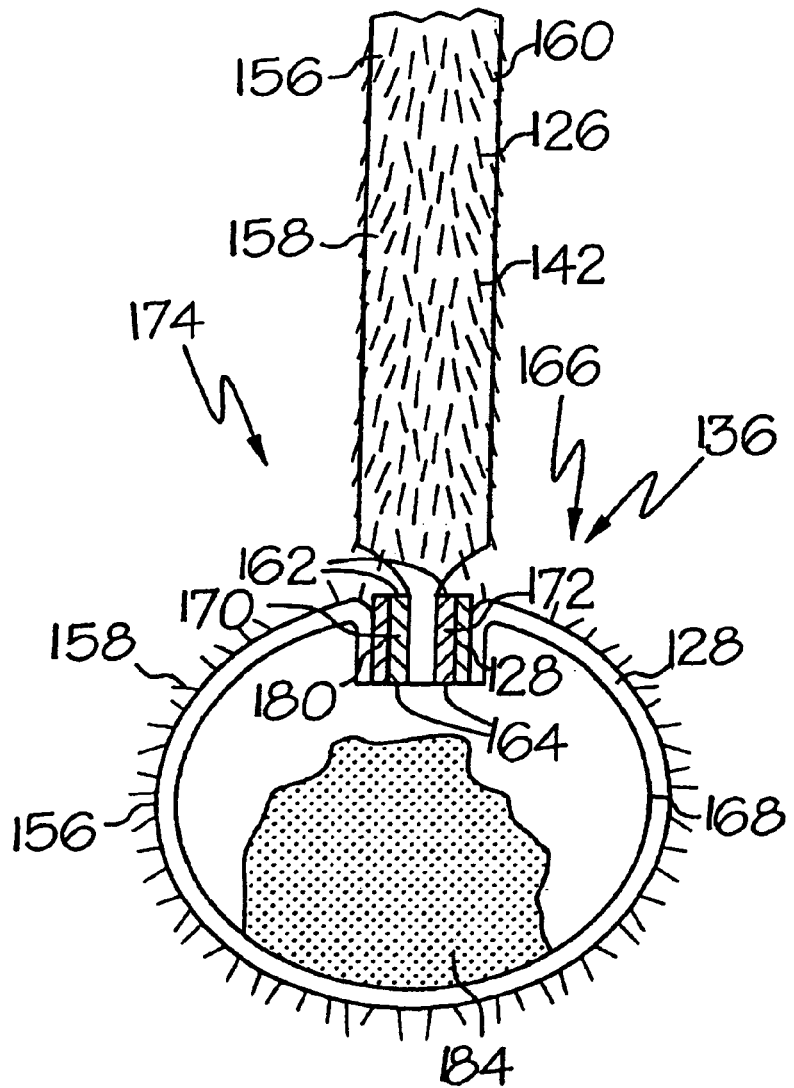
FIG. 19 shows a cross-sectional view depicting the lash coupled to the toy of the pet-play apparatus of FIG. 1 in accordance with a preferred embodiment of the present invention.

FIG. 15 depicts toy 128 detached from lash 126 in solo use by pet 124. FIG. 16 depicts a side view of a portion of lash 26 showing an attachment device 62 affixed to lash 26. FIG. 17 depicts a side view of toy 128 and FIG. 18 depicts a top view of toy 128 showing an attachment device 164 within an opening 166. FIG. 19 shows a cross-sectional view depicting lash 26 coupled to toy 28 in accordance with a preferred embodiment of the present invention.

The following discussion refers to FIGS. 11, 12, and 15 through 19.

Lash 126 detachably couples to toy 128 (i.e., toy 128 may be attached to or detached from lash 126 at will). This allows toy 128 to be a suspended toy (i.e., attached to lash 126) for interactive use with pet 124 (FIGS. 11 and 12) or an independent toy (i.e., detached from lash 126) for solo use by pet 124

(FIG. 15). To accomplish this, lash attachment device 162 is affixed to dangling end 136 of lash 126 (FIGS. 16 and 19) and toy attachment device 164 is affixed to (within) toy 128 (FIGS. 8 and 9). Attachment devices 162 and 164 detachably couple to each other, thereby detachably coupling toy 128 to lash 126.

In the preferred embodiment, toy 128 (FIGS. 17, 18, and 19) is constructed as a pouch 168 or to have a pouch 168. The drawings illustrate toy 128 in the shape of a mouse. The shape of and construction of toy 128 can vary as desired.

When formed as or to include pouch 168, toy 128 has opening 166. Toy attachment device 164 is located within opening 166, hence within pouch 168 and the body of toy 128. Therefore, when lash attachment device 162 is attached to toy attachment device 164, both lash attachment device 162 and toy attachment device 164 are concealed within the body of toy 128. This inhibits the detachment of attachment device 162 and 164 during play, as well as improves the appearance and aesthetics of pet-play apparatus 120.

It is desirable that attachment devices 162 and 164 be made of flexible and substantially non-metallic materials. Additionally, it is desirable that attachment devices 162 and 164 not have hard parts, which may be either detached or broken into sharp fragments and ingested during play, i.e., by biting or chewing.

In the preferred embodiment, attachment devices 162 and 164 are desirably flexible fabric-back hook-and-loop fasteners, such as VELCRO fasteners. Each attachment device 162 or 164 includes opposing pieces of flexible fabric tape, one having a front surface with a dense arrangement of tiny polymeric hooks and the other having a front surface with a dense polymeric pile, that interlock when pressed together. The back surface of each piece of fabric is substantially smooth.

Lash attachment device 162 is desirably affixed to dangling end 136 of lash 126 so that the back surfaces of a hook part 170 and a loop part 172 of attachment device 162 are proximate and substantially parallel. That is, the front surfaces (the hooks and the loops) face outward in substantially opposite directions. Lash attachment device 162 therefore forms a hook-and-loop tab 174 at dangling end 136 of lash 126 (FIG. 16).

Toy attachment device 164 is desirably affixed to inner edges 76 of opening 166 of toy 128 so that the back surface of a hook part 178 of attachment device 164 is affixed to one inner edge 176 and the back surface of a loop part 180 of attachment device 164 is affixed to another inner edge 176 with hook part 178 facing loop part 180. Toy attachment device 64, in conjunction with opening 166, therefore forms a hook-and-loop slot 182 in toy 128 (FIG. 18).

With this arrangement, toy 128 may be coupled to lash 126 as a suspended toy by inserting tab 174 into slot 182 and closing opening 166 so that lash hook part 170 engages toy loop part 180 and lash loop part 172 engages toy hook part 178. Similarly, toy 128 may be used as an independent toy by closing opening 166, without inserting tab 174, so that toy hook part 178 engages toy loop part 180.

Stuffing 184, such as a catnip cachet or a noise-making device, can be inserted into pouch 168 through opening 166. Stuffing 184 serves to increase the bulk of toy 128 and/or provide olfactory or auditory stimulation to increase the attractiveness of toy 128 to pet 124.

Figure 20:
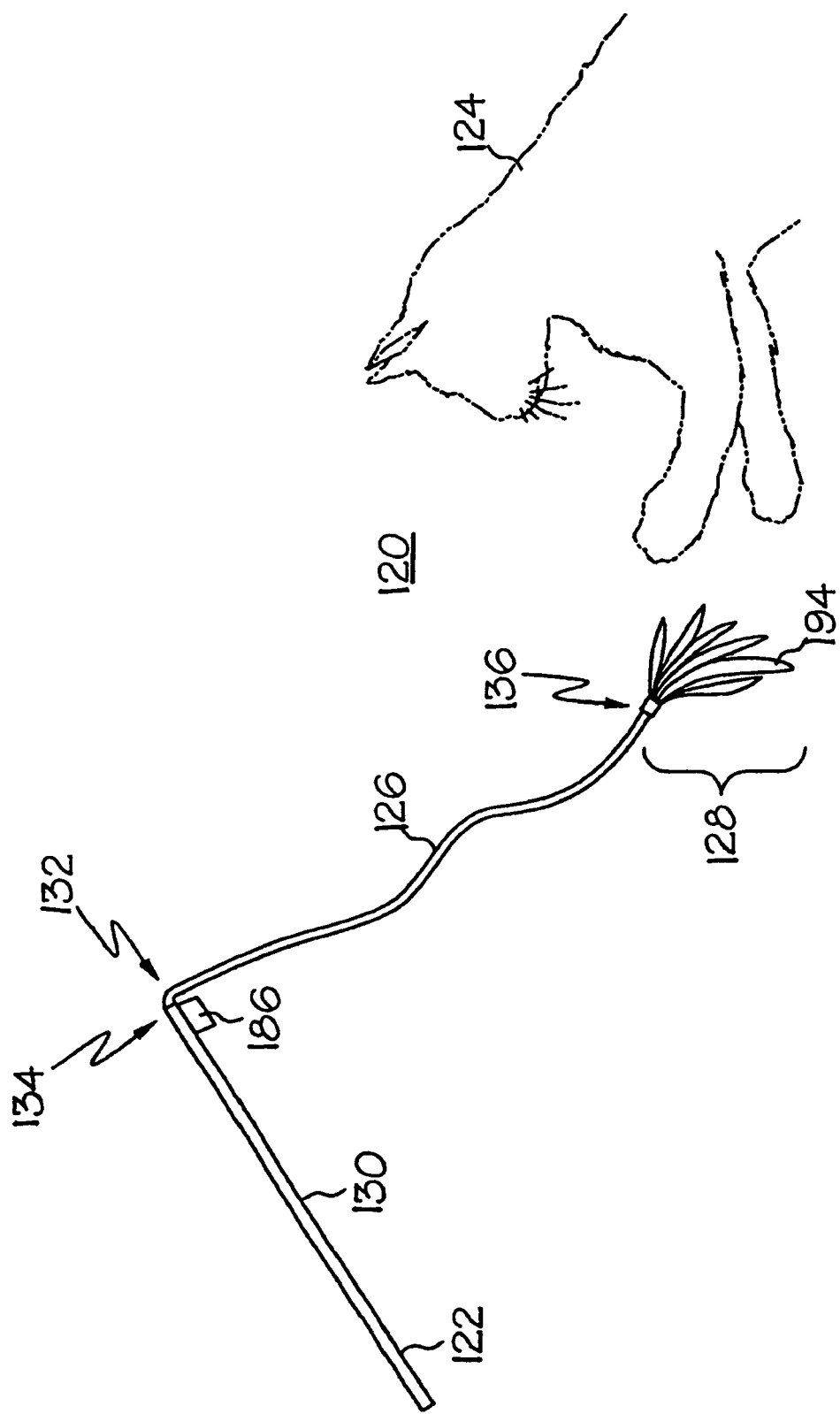
FIG. 20 depicts a pet-play apparatus having a "bird" toy with a sonic device affixed to a crop in accordance with an alternative embodiment of the present invention.
Figure 21:
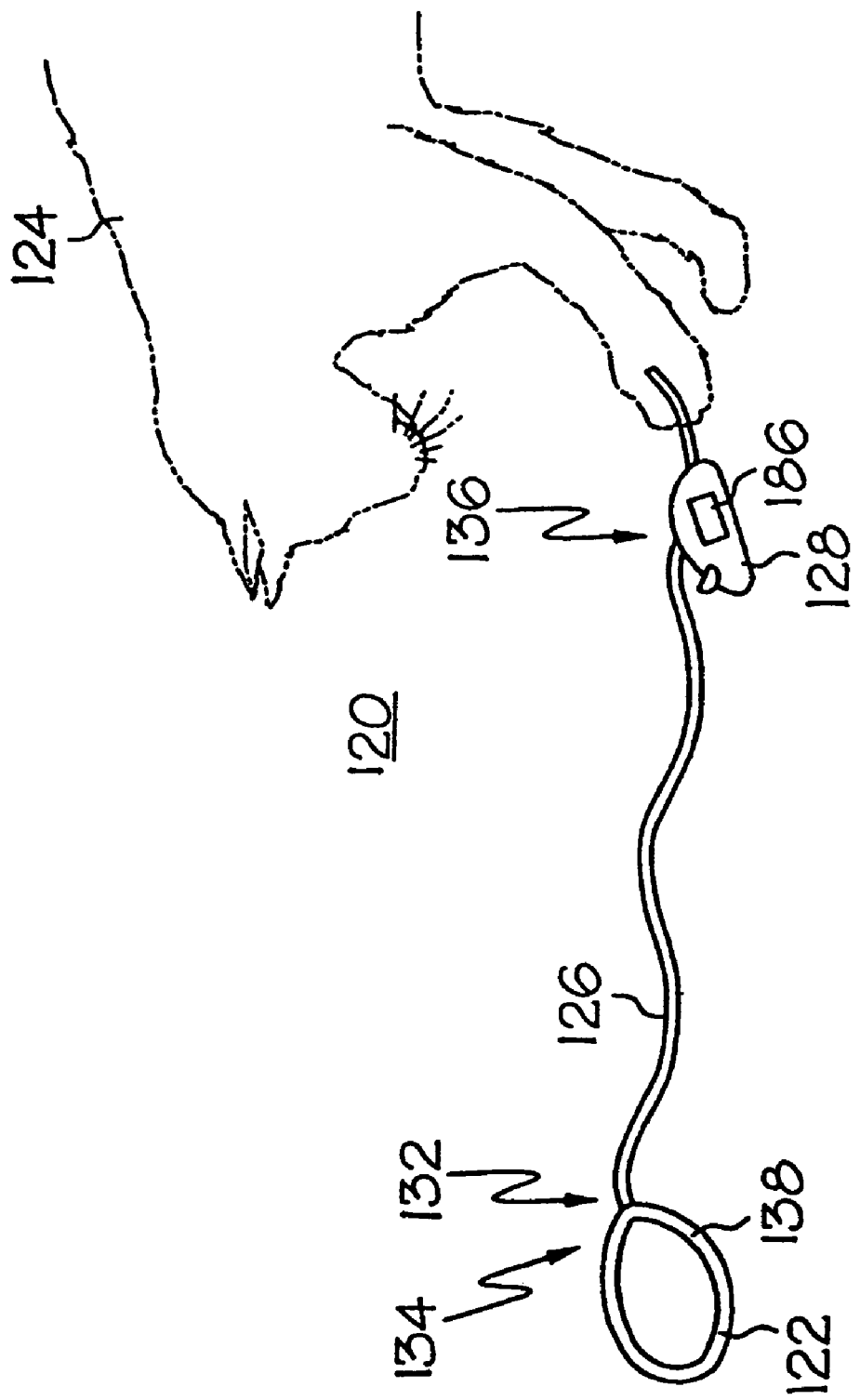
FIG. 21 depicts a pet-play apparatus having a "mouse" toy with a sonic device contained therein in accordance with an alternative preferred embodiment of the present invention.

FIGS. 20 and 21 depict pet-play apparatus 120 incorporating a sonic device 186. Sonic device 186 may be affixed to crop 122 (FIG. 20), or may be located within toy 128 (FIG. 22) in accordance with alternative preferred embodiments of the invention.

The follow discussion refers to FIGS. 10 and 11.

To provide additional stimulation of pet 124, it is advantageous to incorporate sonic device 186 into the design of pet-play apparatus 120. Sonic device 186 may be any device that produces sounds that entice or otherwise attract pet 124 to play with apparatus 120.

Preferably, the sound emitted by sonic device 186 is a prey-sound for pet 124. In the preferred embodiment, pet 124 is a domestic cat. The sound is then a relatively quick sound less than one second in duration. For example, the sound might be a chirp or a squeak, thereby emulating to the cat (pet 124) the sound of a bird or a mouse, its natural prey. Sounds other than prey-sounds can, if desired, be produced by a sonic device.

Sonic device 186 presently is an electronic circuit containing a piezoelectric element configured to produce a desired sound when toy 128 and device 186 are subjected to motion. In the preferred embodiment of FIG. 20, crop 122 is wand 130 and toy 128 is a "bird", i.e., toy 128 is a small solid toy with at least one feather 194, either real or synthetic, or like object, thereby suggesting a bird to pet 124. Sonic device 186 is affixed to crop 122. Movement of crop 122 causes sonic device 186 to emit sound.

In FIG. 21, crop 122 is loop 138 and toy 128 is a "mouse" (i.e., toy 128 is a small stuffed toy shaped to suggest a mouse to pet 124). Sonic device 186 is located inside toy 128. A movement of toy 128 causes sonic device 186 to emit sound.

The components of FIGS. 20 and 21 are interchangeable. Crop 22 may be configures as either wand 130 or loop 38. Toy 128 may be implemented as either a "bird" or a "mouse", and sonic device 186 may be either affixed to crop 122 or located within or affixed to toy 128, in any combination, without department from the spirit of the present invention.

The following discussion refers to FIGS. 15 to 19 and 21.

Alternatively, toy 128 may be implemented as a "bird". In its simplest form, a "bird" is a collection of feathers 194 or similar objects bound together. It has no "inside" into which sonic device 186 may be placed. Since it is not desirous that sonic device 186 or any other hard thing be on or at toy 128 where is may strike and/or startle pet 124, the use of the "bird" implementation of toy 128 typically results in the attachment of sonic device 186 to crop 122.

When implemented as a "bird", toy 128 has not inside, and therefore no opening 166, with associated hook-and-loop slot 182 (see "mouse" embodiment of toy 128 in FIG. 18). The arrangement and placement of attachment devices 162 and 164 is therefore slightly different than that used for a "mouse" implementation of toy 128.

Figure 22:
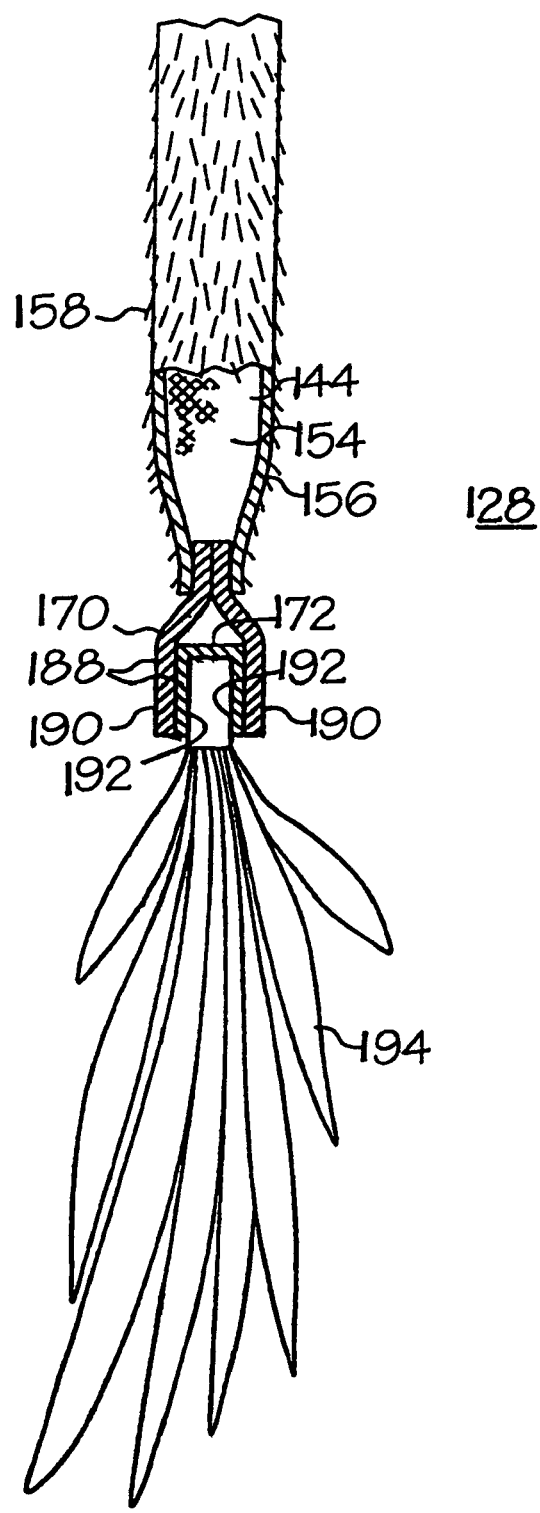
FIG. 22 depicts a portion of a pet-play apparatus demonstrating attachment of a toy to a lash in accordance with an alternative preferred embodiment of the present invention.
Figure 23:
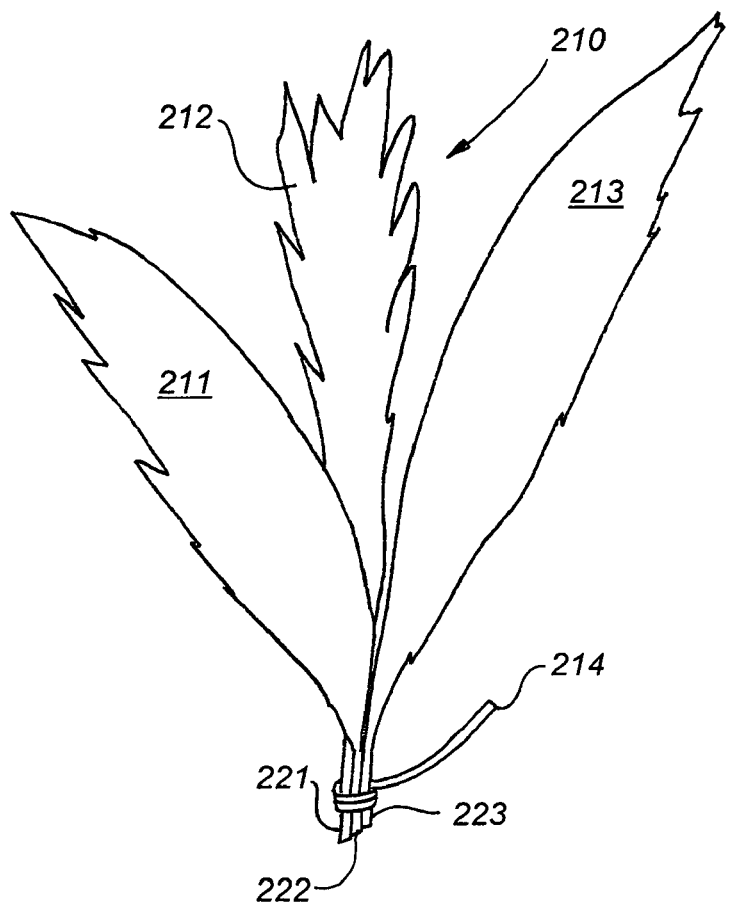
FIG. 23 is a front view illustrating the binding together of quills during the process of making a light-weight cat toy in accordance with an embodiment of the invention.

In the preferred embodiment of FIG. 22, first attachment device 162 incorporates hook part 170, and second attachment device 164 incorporates loop part 172. First attachment device 162 can incorporate loop part 172 and second attachment device 164 can incorporate hook part 170, if desired.

Hook and loop parts 170 and 172 are, as demonstrated in FIG. 22, bipartite. Hook part 170 is a folded strip, the center of which is sewn or otherwise affixed inside tube 142 of lash 126, thereby forming two hook tabs 190. Correspondingly, loop part 172 is a strip folded over and affixed around an end of toy 128, thereby forming two loop tabs 192. Each of hook tabs 190 mates with (i.e., detachably couples to) a corresponding loop tab 192. This provides a strong, yet detachable, coupling between toy 128 and lash 126.

It is not required that hook part 170 and loop part 172 be bipartite, i.e., form two hook tabs 190 and two loop tabs 192, respectively. Hook and loop parts 170 and 172 from two different hook-and-loop fasteners 188 can form individual hook and loop tabs 190 and 192. First attachment device 162 can have either hook or loop tab 190 or 192 formed from hook or loop part 170 or 172, respectively, of a first hook-and-loop fastener 188, and either hook or loop tab 190 or 192 formed from hook or loop part 170 or 172, respectively, of a second hook-and-loop fastener 188, with second attachment device 164 having the corresponding mating parts.

The invention shown in FIGS. 11 to 22 comprises pet-play apparatus 120 configures for interactive use with a pet 124. Pet-play apparatus 120 can include sonic device 186 to stimulate use of apparatus 120, wherein sonic device 186 emits pre-sounds for pet 124 in response to movement of sonic device 186 or to compression of device 186. Pet-play apparatus 120 includes detachable toy 128 and lash 126 made from fabric strip 140 formed into tube 142.

Figure 25:
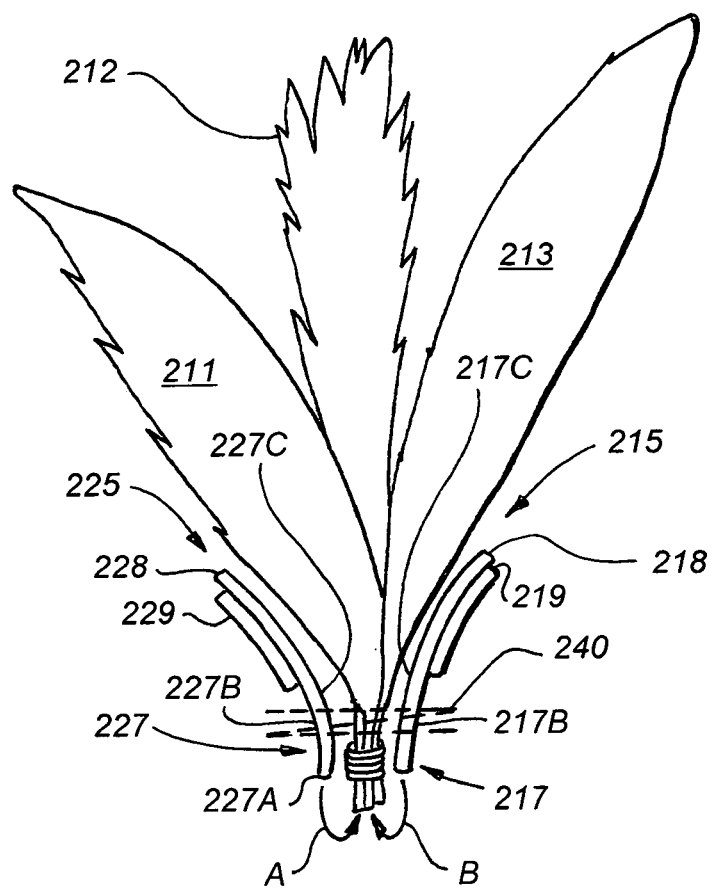
FIG. 25 is a front view illustrating the assembly of the toy components depicted in FIGS. 23 and 24, along with a second fabric—VELCRO fastener of the type illustrated in FIG. 24.
Figure 26:
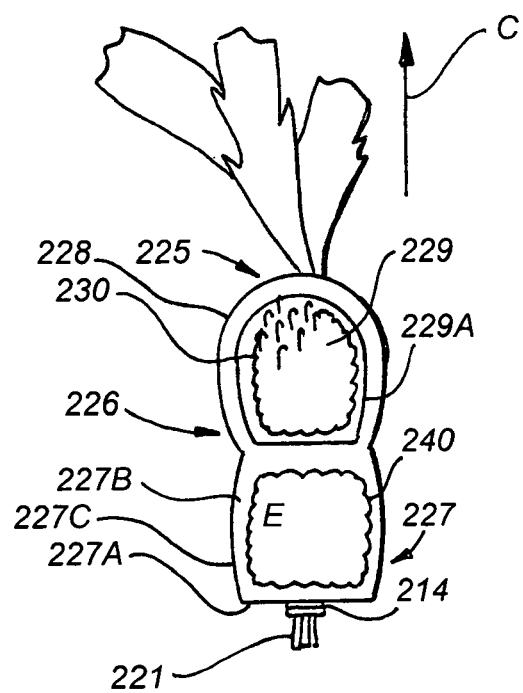
FIG. 26 is a side view of the assembled toy components of FIG. 25 illustrating the turning inside-out of the fabric—VELCRO fasteners of said assembled toy components.
Figure 27:
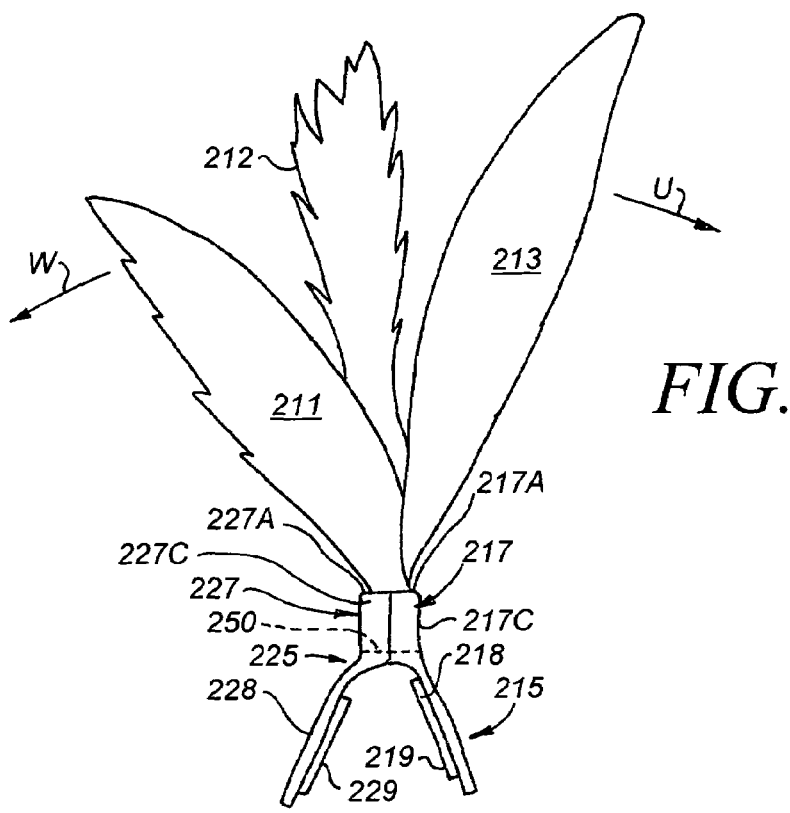
FIG. 27 is a front view illustrating the completed light-weight cat toy after the assembled toy components of FIG. 26 are turned inside-out.

FIGS. 23 to 27 illustrate a cat toy constructed in accordance with another embodiment of the invention. The completed toy is illustrated in FIG. 27.

The first step in producing the toy is to provide a plume. By way of example, and not limitation, the plume illustrated in FIG. 23 includes several feathers 211, 212, 213. A length of string or thread or yarn or other fabric 214 binds together the lower ends of the quills of feathers 211, 212, 213. A pair of generally hour-glass shaped pieces 215, 225 of felt or some other material are provided. Glue or staples are not utilized to bind together the lower ends of the quills of feathers 211, 212, 213 because of possible injury to the cat in the event the cat tears the toy apart.

Figure 24:
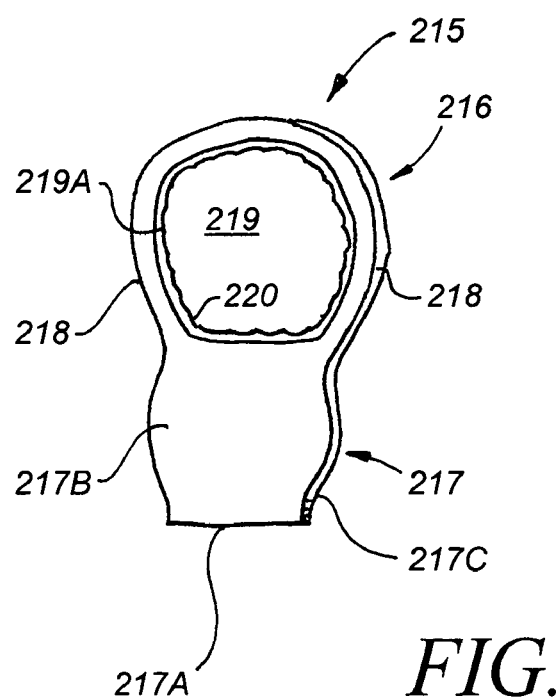
FIG. 24 is a front view illustrating a fabric—VELCRO fastener component used in making a light-weight cat toy.

In FIG. 24, felt piece 215 includes upper portion 216, lower portion 217, and, a piece 219 of loop (or hook) VELCRO fastener attached to upper portion 216 by stitching 220. Stitching 220 and the outer edge 219A of piece 219 are spaced apart from the outer edge 218 of felt member 215. The spacing of outer edge 219A from edge 218 is in the range of one-sixteenth to three-quarters of an inch, preferably one-sixteenth to one-quarter inch. This spacing is important because it helps minimize the likelihood that the toy will injure the gums of a cat chewing on or biting the toy. Lower portion 217 includes lower edge 217A. A cat biting the toy normally contacts with his or her mouth the outer soft edge 218 of felt piece 215, instead of the outer edge of VELCRO piece 219. VELCRO fastener material, including the hooks and loops and backing for the hooks and loops, tends to be somewhat hard, stiff, and abrasive.

Felt piece 225 is identical to felt piece 215. Piece 225 includes upper portion 226, lower portion 217, and a piece 229 of hook (or loop) VELCRO™ fastener attached to upper portion 226 by stitching 230. Stitching 230 and the outer edge 229A are spaced apart and inset from the outer edge 228 of member 225. The distance of outer edge 229A from edge 228 is in the range of one-sixteenth to three-quarters of an inch, preferably one-sixteenth to one quarter inch. This spacing is important because it helps minimize the likelihood that the toy will injure the gums of a cat chewing on or grasping the toy with his or her mouth. Lower portion 227 includes lower edge 227A. A cat biting the toy normally contacts with his or her mouth the outer soft edge 228 of felt piece 225.

Felt pieces 215, 225 are positioned adjacent the bound lower ends of the quills in the position illustrated in FIG. 25 such that thread 240 can be stitched through lower portions 217 and 227 in the manner generally indicated. The resulting stitching semi-circular pattern is illustrated in FIG. 26. Thread 240 passes completely through both felt pieces 215, 225. Only the lower section of the stitching indicated by bracket E in FIG. 26 passes through portions of the lower quill ends to securely attach felt pieces 215, 225 to the lower ends of the quills. This stitching style enables lower portions 217 and 227 to be turned inside-out in the manner described below. Pieces 215, 225 can consist of any desired material, but preferably consist of a soft fabric or paper or mesh material that normally is not abrasive to the gums of a cat if the cat bites the material. Further, and importantly, pieces 215, 225 preferably consist of a non-fraying fabric such as felt or fleece. Fabric that frays is not preferred because it is preferred that cats not ingest strands of thread (or other material) and strands of thread not become intertwined with a cat claws, teeth, etc.

After pieces 215 and 225 are stitched to the feathers 211 to 213 in the manner illustrated in FIG. 25, the upper portions 216 and 226 are gently pressed between the fingers of one of the user's hands, and, the upper portions of feathers 211 to 213 are grasped with the other of a user's hands and are pulled upwardly in the direction of arrow C while maintaining upper portions 216 and 226 in fixed position. Pulling feathers 211 to 213 upwardly pulls lower portions 217 and 227 upwardly intermediate and through upper portions 216 and 226 and turns the lower portions 217 and 227 inside-out to produce the resulting configuration illustrated in FIG. 27. In FIG. 27, the thread 240 is hidden inside portions 217 and 227 and is not readily seen or detected. After lower portions 217, 227 are turned inside-out, additional stitching 250 can, if desired, be made to further secure together portions 217, 227 and to hide the quill ends of feathers 211 to 213. If desired, pieces 215 and 225 can, before any stitching is undertaken, be placed adjacent the lower ends of the quills in the general orientation illustrated in FIG. 27 and then stitched to each other and to the lower ends of the quills.

One important advantage of the feather-felt (or fleece)—thread—VELCRO cat toy illustrated in FIG. 27 is that it can have an unusually light weight. When the length of each of feathers 211 to 213 is no more than six inches and when twenty four feathers are utilized to make the plume, the toy typically weighs only 0.1 ounce. Although the toy can have any desired weight, it is preferred that the toy weigh less than eight ounces, preferably less than five ounces, and most preferably less than 0.2 ounce. The unusually light weight of the toy significantly reduces the likelihood that a cat will be injured or will be irritated by the toy.

Another important advantage of the cat toy of FIG. 27 is that it unusually soft, which, in addition to reducing the likelihood of injury, makes the "touch" or "feel" of the toy appealing to cats. One reason the toy is soft is the kind of feather that is preferably utilized in the toy.

There are several kinds of feathers. One category of feather is the contour feather.

Contour feathers include flight feathers and body feathers. Flight feathers 420 (FIG. 40) are asymmetrical. The vane 421 on one side of the feather is smaller than the vane 422 on the other side. This is because the pressures on the leading edge of a flight feather are far greater than the forces acting on the trailing edge of the feather. If the vane on the leading edge of the feather were as large as the vane on the trailing edge, the leading edge would rapidly become ragged and not function. Flight feathers tend to be stronger and more rigid than other feathers. The great majority of a flight feather consists of pennaceous vanes 421, 422. Pennaceous vanes are stiffer and stronger than plumulaceous vanes 423. Plumulaceous vanes 423 are soft and downy.

Body feathers 425 (FIG. 11) have, in contrast to flight feathers, pennaceous vanes 426, 427 that are generally symmetrical. Body feathers also, in contrast to flight feathers, consist in much larger proportion of plumulaceous vanes 428, 229. Body feathers also tend to be smaller than flight feathers. The smaller size of body feathers and the larger proportion of plumulaceous vanes often makes body feathers 425 much softer than flight feathers.

Another kind of feather is the down feather 431 (FIG. 42). Down feathers are smaller than contour feather and do not have the barbules and hooklets found in pennaceous vanes. Down feathers are soft and fluffy.

Still another kind of feather is the semiplume feather 430 (FIG. 43). A semiplume feather is similar in some respects to a down feather and in other respects to a contour feather. Semiplume feathers are relatively soft and fluffy.

When a plume for the toy of FIG. 27 includes feathers, or consists entirely of feathers, flight feathers 420, although they can be used, are not preferred. Body feathers 425, down feathers 431, and/or semiplume feathers 430 are preferred, because they produce an unusually light weight and soft plume.

Non-fraying materials like felt or fleece can be utilized to form elongate strands 405, 406 or to form other pliable objects that comprise a part of the plume. Pliable strands 405, 406 (FIG. 37) are at least one thirty-second inch thick L, preferably are at least one sixteenth inch thick, and most preferably are at least one eighth of an inch thick.

VELCRO pads 219 and 229 can be utilized to attach the toy of FIG. 27 to other objects, or, if one pad 219, 229 is hook material and the other pad 219 is loop material, to connect releasably pad 219 to pad 229. When pads 219, 229 are connected to each other or to VELCRO material on another object, portions 217 and 227 can pliably bend or function like a hinge along the line indicated by dashed line 250 in FIG. 27, permitting portions 217, 227 and feathers 211 to 213 to pivot or move back and forth (as if on a hinge) in the directions indicated by arrows U and W while pieces 215 and 225 remain in fixed position. Portions 217 and 227 can pivot from the position shown in FIG. 27 in the direction of arrow U (or in the direction of arrow W) through an angle of about 180 degrees such that portion 217 contacts piece 215 (or portion 227 contacts piece 225 when pivoted in the direction of arrow W). Portions 217 and 227 can bend in this fashion because they are fabricated from soft felt or fleece or some other soft pliable material.

Figure 27A:
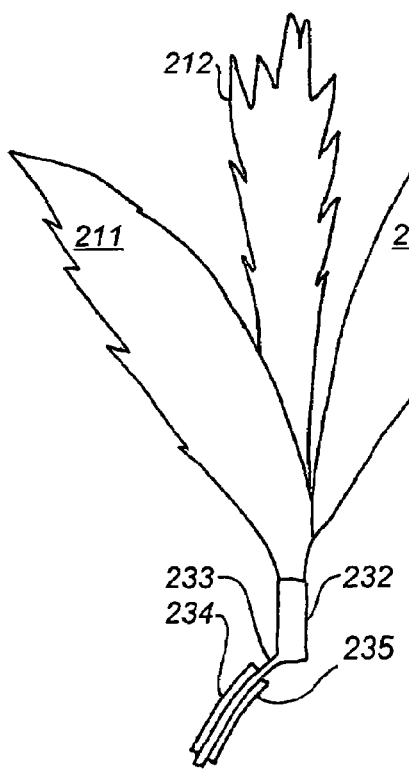
FIG. 27A is a front view illustrating an alternate embodiment of the light-weight cat toy of FIG. 27.

FIG. 27A illustrates another embodiment of the lightweight cat toy of FIG. 27. In FIG. 27A, a sleeve 232 is attached to the lower end of the quills of feathers 211 to 213. The sleeve includes a flap 233 having at least one piece 234 or 235 of VELCRO or some other fastener attached to the flap 233. Pieces 234, 235 can each comprise hook material, can each comprise loop material, or, one piece can comprise hook material while the other comprises loop material. As used herein, loop material is any material to which VELCRO hook material will adhere. Flap 233 can be rigid, but is preferably pliable and preferably is fabricated from felt or fleece or some other soft fabric material. The threads used to produce fabric material referred to herin can be natural or synthetic.

Figure 27B:
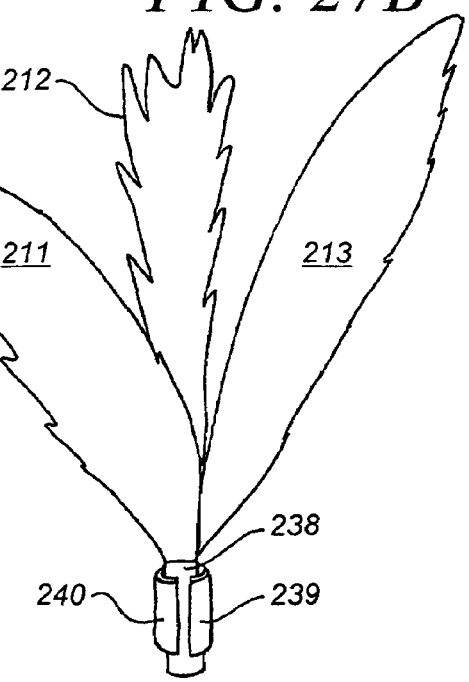
FIG. 27B is a front view illustrating a further embodiment of the light-weight cat toy of FIG. 27.

FIG. 27B illustrates another embodiment of the lightweight cat toy of FIG. 27. In FIG. 27B, a sleeve 238 is attached to the lower end of the quills of feathers 211 to 213. At least one piece 239 or 240 of VELCRO or some other fastener is attached to the sleeve 238. Pieces 239, 240 can each comprise hook material, can each comprise loop material, or, one piece can comprise hook material while the other comprises loop material. Sleeve 238 can be rigid, but is preferably pliable and preferably is fabricated from felt or fleece or some other soft fabric material.

Figures 28, 29, 30:
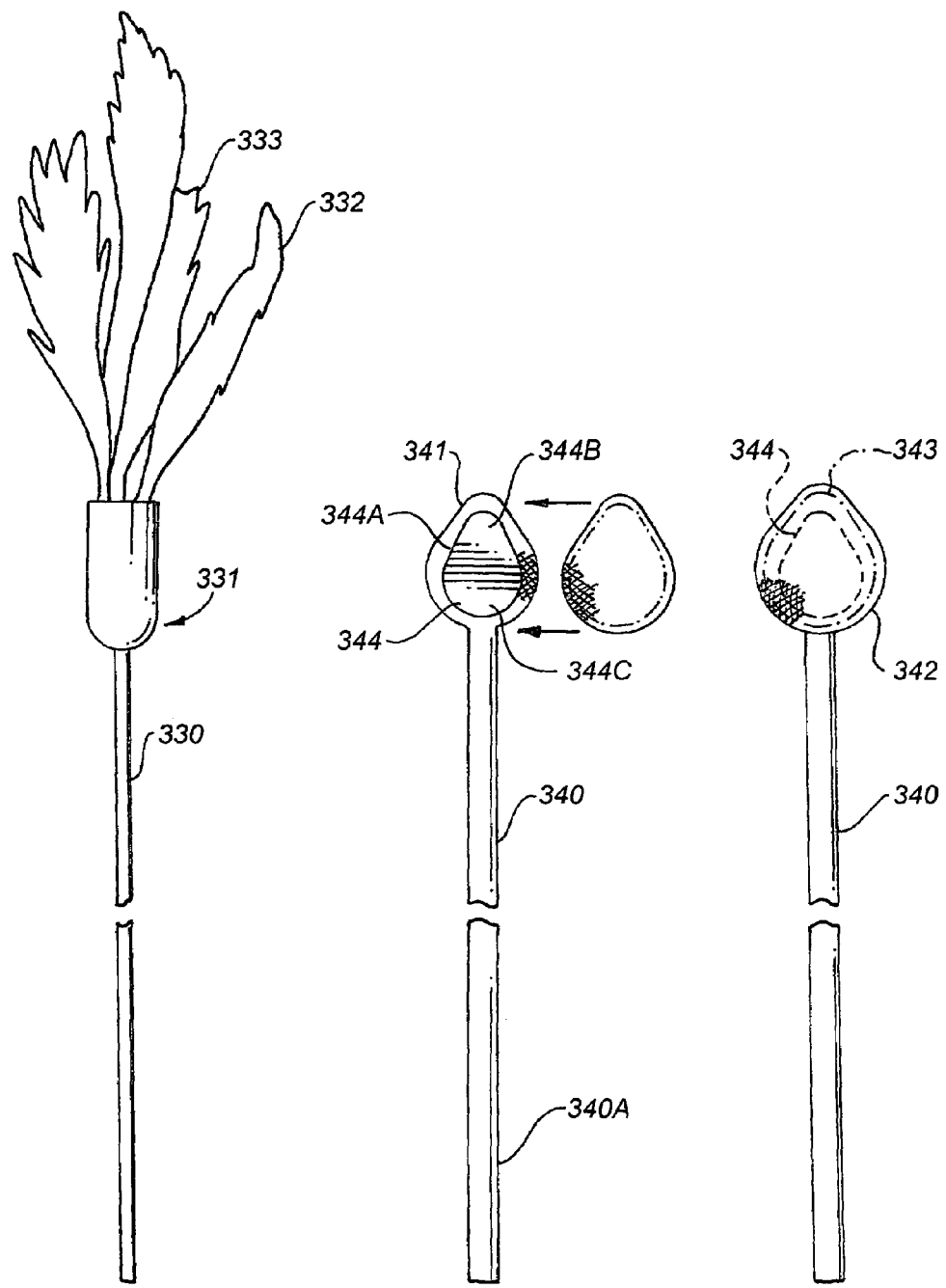
FIG. 28 is a front view illustrating a prior art "wand" or "stick" or "teaser" cat toy.
FIG. 29 is a front view illustrating stitching hook-and-loop fabric on a stick configured in accordance with an embodiment of the invention during a process for producing a stick cat toy.
FIG. 30 is a front view illustrating the stick of FIG. 29 after the hook-and-loop fabric is stitched on the stick.

FIG. 28 illustrates a conventional "feather teaser". The teaser includes a hard, hollow plastic cup 331. The lower quill ends of feathers 332, 333 are glued inside the cup 331. Strips of mylar or other relatively soft, pliable materials can also be glued in cup 331 with or without feathers 332, 333 to produce a plume. Mylar, however, can cause intestinal obstructions in cats. The cup 331 is secured to the upper end of a pliable plastic stick 330. The conventional teaser of FIG. 28 apparently has existed for ten to twelve years and has not evolved from its current, and past, construction. Since the lower ends of the feathers are glued and fixed in the plastic cup 331, the lower ends of the feathers have no flexibility. When the feathers fall out of the base, the stick 330 and cup 331 are discarded and are not reused. The conventional "feather teaser" is believed to have limited play usefulness because after a cat is "dusted in the face" with the feathers, or the feathers are run beneath a rug, the cat tires of the game because the feather teaser does not change. When the hard plastic cup 331 strikes a cat's paw or other portion of the cat's body, it can hurt, particularly when the cat's owner is swishing or oscillating the stick back-and-forth.

Accordingly, it would be highly desirable to provide an improved feather teaser that has a plume that can be readily replaced when worn out.

It would also be highly desirable to provide an improved feather teaser that would enable different plumes or other toys to be interchangeably utilized in the feather teaser.

It would further be highly desirable to provide an improved feather teaser that would include a stick having an attachment head that could be readily replaced when worn.

It would still further be highly desirable to provide an improved feather teaser that includes a plume and that would extend the useful life of the teaser by maintaining plumes in place for an extended period of time;

It would yet further be highly desirable to provide an improved feather teaser that would not utilize glue, mylar, or other components considered unsafe for cats.

It would yet still further be highly desirable to provide an improved feather teaser that did not secure a plume in a hard cup or holder, but that secured a plume in a soft, flexible, hinged object.

FIGS. 29 and 30 illustrate one embodiment of a feather teaser constructed in accordance with the invention. Tapered cone-shaped head 344 is attached to the upper end of stick 340. The material utilized to fabricate head 344 and stick 340 can vary as desired but is presently preferably a polymer. Head 344 includes peripheral edge 344A. Stick 340 can be rigid but is preferably elastic such that when handle 340A is held in fixed position, the upper end of stick 340 and head 344 can be displaced to elastically bend stick 340. A pair of equally shaped and dimensioned cone-shaped pieces 341, 342 of loop VELCRO fastener material are provided. Each piece 341, 342 is positioned against one side of head 344 in opposition to the other piece 341 in the manner illustrated in FIGS. 29 and 30 such that the loop surface of each piece 341, 342 faces outwardly. Pieces 341 and 342 are stitched together by thread that forms stitch line 343. The thread in line 343 extends between and fastens together pieces 341 and 342 adjacent peripheral edge 344A. The thread can, but preferably does not, pass through head 344. Adhesive or other fastening means can be utilized to secure pieces 341, 342 to head 344. Once pieces 341, 342 are fastened to head 344 with thread, pieces 341, 342 typically can slidably move short distances on head 344. The shape, however, of head 344 and the close proximity of stitch line 343 to peripheral edge 344A prevents pieces 341, 342 from moving any great distance. If desired, one piece 341 of hook-and-loop fastening material can comprise VELCRO hook fastening material and the other piece 342 of hook-and-loop fastening material can comprise VELCRO loop fastening material, or, both pieces can comprise VELCRO hook material. Plume toys, including but not limited to those illustrated in FIGS. 27 and 27A and 27B, (or other toys) are detachably secured to VELCRO pieces 341, 342 to complete the feather teaser toy. Different toys can be interchangeably mounted on VELCRO pieces 341, 342, or, on other releasable fastener systems provided on stick 340.

Figure 33:
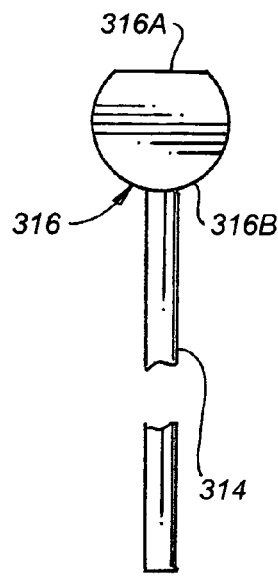
FIG. 33 is a side view illustrating a portion of the stick of FIG. 31 prior to the application of hook-and-loop material thereto.

An alternate feather teaser construction is illustrated in FIGS. 31 to 33. Truncated, tapered, rounded head 316 is attached to the upper end of stick 314. The material utilized to fabricate head 316 and stick 314 can vary as desired but is presently preferably a polymer. Head 316 includes a peripheral edge including lengths 316A and 316B. Stick 314 can be rigid but is preferably elastic such that when handle end 314A is held in fixed position, the upper end of stick 314 and head 316 can be displaced to elastically bend stick 314. A pair of equally shaped and dimensioned truncated, rounded pieces 309, 310 of hook and of loop VELCRO fastener material, respectively, are provided. Each piece 309, 310 is fastened with adhesive to a different opposing side of head 314 in the manner illustrated in FIGS. 31 and 32 such that the hook or loop surface of each piece 309, 310 faces outwardly. The upper edge of each piece 309, 310 extends above edge 316A. These upper edges are stitched together by thread that forms stitch line 308. Other fastening means can be utilized to secure pieces 309, 310 head 316. If desired, both pieces 309, 310 can comprise VELCRO hook fastening material or can comprise VELCRO loop fastening material. Plume toys, including but not limited to those illustrated in FIGS. 27 and 27A and 27B, (or other toys) are detachably secured to VELCRO pieces 341, 342 to complete the feather teaser toy.

Figure 34:
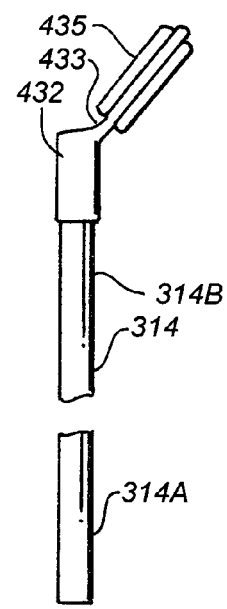
FIG. 34 is a front view illustrating an alternate configuration of the stick of FIG. 30.

Still another alternate feather teaser construction is illustrated in FIG. 34. In FIG. 34, a sleeve 432 and flap 433 is attached to the upper end 314B of stick 314. Pliable flap 433 is connected to sleeve 432. VELCRO fastening material 435 is secured to at least one side of flap 433. The material utilized to fabricate sleeve 432 and flap 433 can vary as desired but is presently preferably a soft fabric material(s). Adhesive or any other fastening system of material can be utilized to secure sleeve 432 to stick 314 and to secure VELCRO fastening material 435 to flap 433. Flap 433 and sleeve 432 can consist solely of VELCRO fastening material. VELCRO fastening material 229, 219, 234, 235, 239, or 240 can be removably attached to VELCRO fastening material 435 to removably secure the plume toys of FIGS. 27, 27A, 27B (or to secure any other desired toys) to VELCRO fastening material 435.

Figure 35:
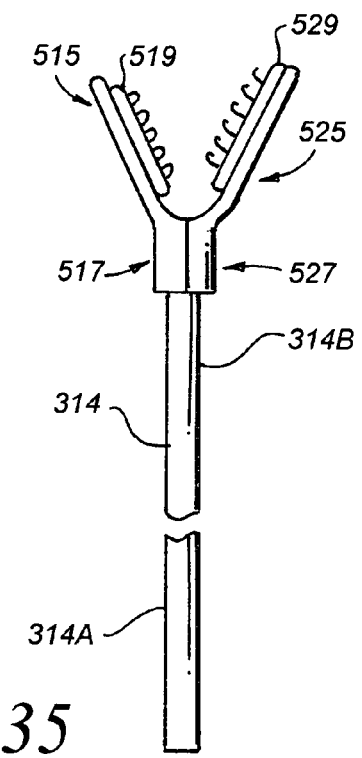
FIG. 35 is a front view illustrating still another configuration of the stick of FIG. 30.

Still a further alternate feather teaser construction is illustrated in FIG. 35. In FIG. 35, a sleeve 517, 527 is attached to the upper end 314B of stick 314. Pliable flaps 515, 525 are connected to sleeve 517, 527. Hook 529 and loop 519 VELCRO fastening material is secured to each flap 515, 525. The material utilized to fabricate sleeve 517, 527 and flaps 515, 525 can vary as desired but is presently preferably a soft fabric material(s). Adhesive or any other fastening system of material can be utilized to secure sleeve 517, 527 to stick 314 and to secure VELCRO fastening material 519, 529 to flaps 515, 525. The construction of sleeve 517, 527 and flaps 515, 525 can, if desired but not necessarily, be equivalent to the construction 217, 227, 215, 225 described in FIGS. 23 to 27. VELCRO fastening material 229, 219, 234, 235, 239, or 240 can be removably attached to VELCRO fastening material 519, 529 to removably secure the plume toys of FIGS. 27, 27A, 27B (or to secure any other desired toys) to VELCRO fastening material 519, 529.

Figure 36:
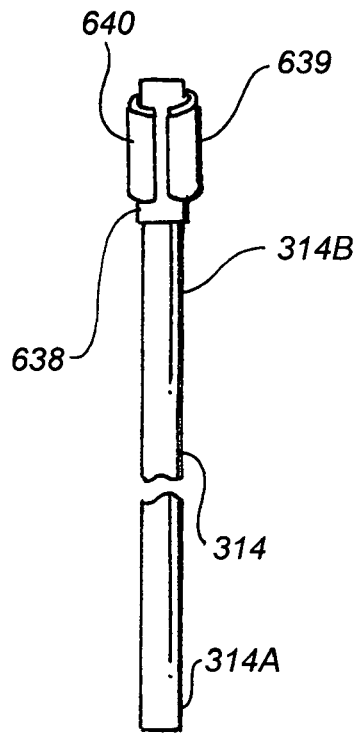
FIG. 36 is a front view illustrating a further configuration of the stick of FIG. 30.

Yet another alternate feather teaser construction is illustrated in FIG. 36. In FIG. 36, a sleeve 638 is attached to the upper end 314B of stick 314. VELCRO fastening material 639, 640 is secured to sleeve 638. Material 639 is loop fastener material and material 640 is hook fastener material. Both materials 639, 640 can, if desired, be loop fastener material or hook fastener material. The material utilized to fabricate sleeve 638 can vary as desired but is presently preferably felt or fleece or some other soft fabric material(s). Adhesive or any other fastening system of material can be utilized to secure sleeve 638 to stick 314 and to secure VELCRO fastening material 639, 640 to sleeve 638. VELCRO fastening material 229, 219, 234, 235, 239, or 240 can be removably attached to VELCRO fastening material 639, 640 to removably secure the plume toys of FIGS. 27, 27A, 27B (or to secure any other desired toys) to VELCRO fastening material 639, 640.

Figure 36A:
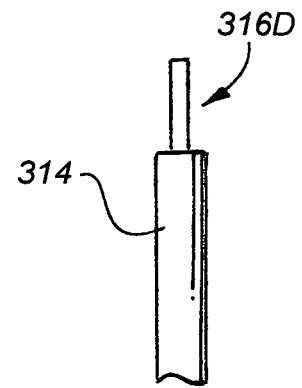
FIG. 36A is a side view illustrating still a further configuration of the stick of FIG. 30.
Figure 36B:
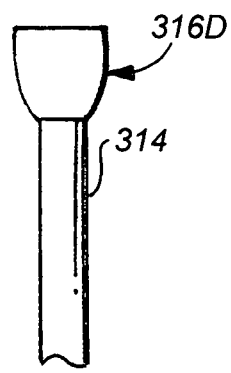
FIG. 36B is a front view illustration the stick of FIG. 36A.

An alternate construction of stick 314 is illustrated in FIGS. 36A and 36B, and includes a head 316D attached to the upper end of stick 314. Hook-and-loop fastener material is glued, stitched, or otherwise fastened to head 316D to partially or completely cover head 316D.

Wand 26 and sticks 314 and 340 (1) permit the lightweight toy of FIG. 27 to be readily replaced or reattached because the VELCRO fastening material permits the toy of FIG. 27 to be readily attached to and detached from a wand 26 or sticks 314, 340, and (2) permit one lightweight toy of FIG. 27 to be exchanged for another different toy if a cat becomes bored playing with one toy.

Stitching together the toy of FIG. 27 is believed to allow different kinds of objects (felt and feathers for example) to be incorporated in the toy because machine stitching more readily than glue keeps different kinds of objects secured together.

The toy in FIG. 27 preferably utilizes feathers and felt and fleece other objects that are not dangerous to cats. In contrast, mylar, if swallowed, can cause intestinal obstruction in a cat. Felt and fleece do not fray.

In one preferred embodiment of the invention, the toy of FIG. 27 can be removably secured to the end of a lash 126 in the manner illustrated in FIG. 22. The toy of FIG. 27 can then be removed from lash 126 and secured to the end of a stick 314 in the manner illustrated in FIG. 31. This permits the toy of FIG. 27 to be readily utilized to produce two different toys (one on a lash, the other on a stick). Using two different toys makes a play time more interesting for a cat. The toy of FIG. 27 can be sold in a package along with a lash 126 and a stick 314.

Figure 37:
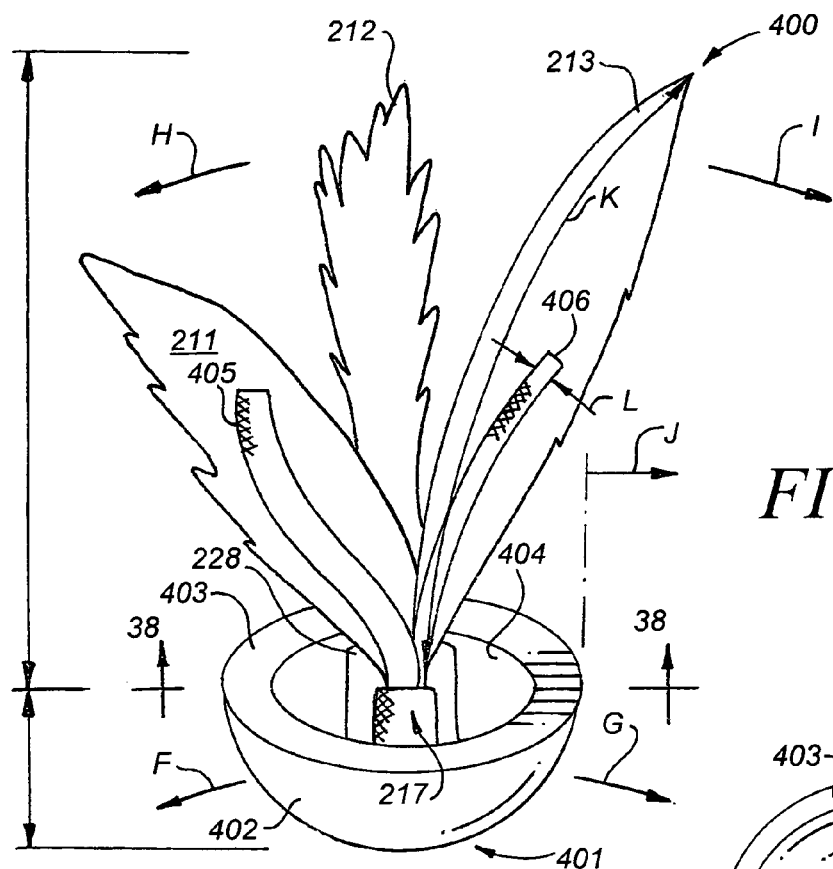
FIG. 37 is a front perspective view illustrating a light weight self-righting play toy for a cat.
Figure 39:
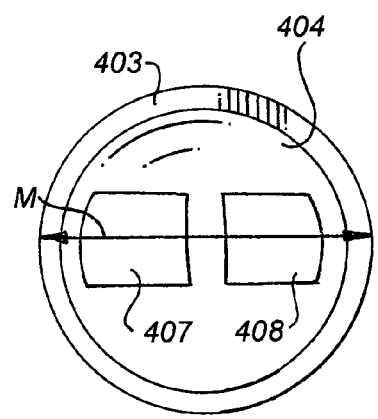
FIG. 39 is a top view illustrating the hollow, arcuate, self-righting base of the toy of FIG. 37.
Figure 38:
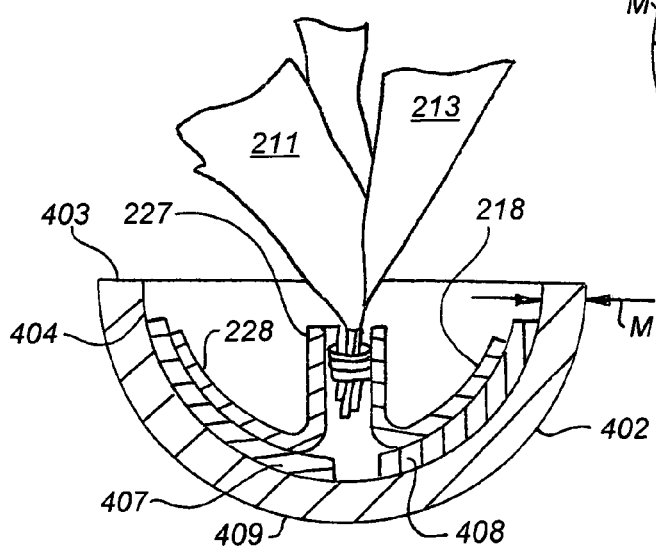
FIG. 38 is a partial section view further illustrating the light weight toy of FIG. 37 and taken along section line 38-38 thereof.
Figure 44:
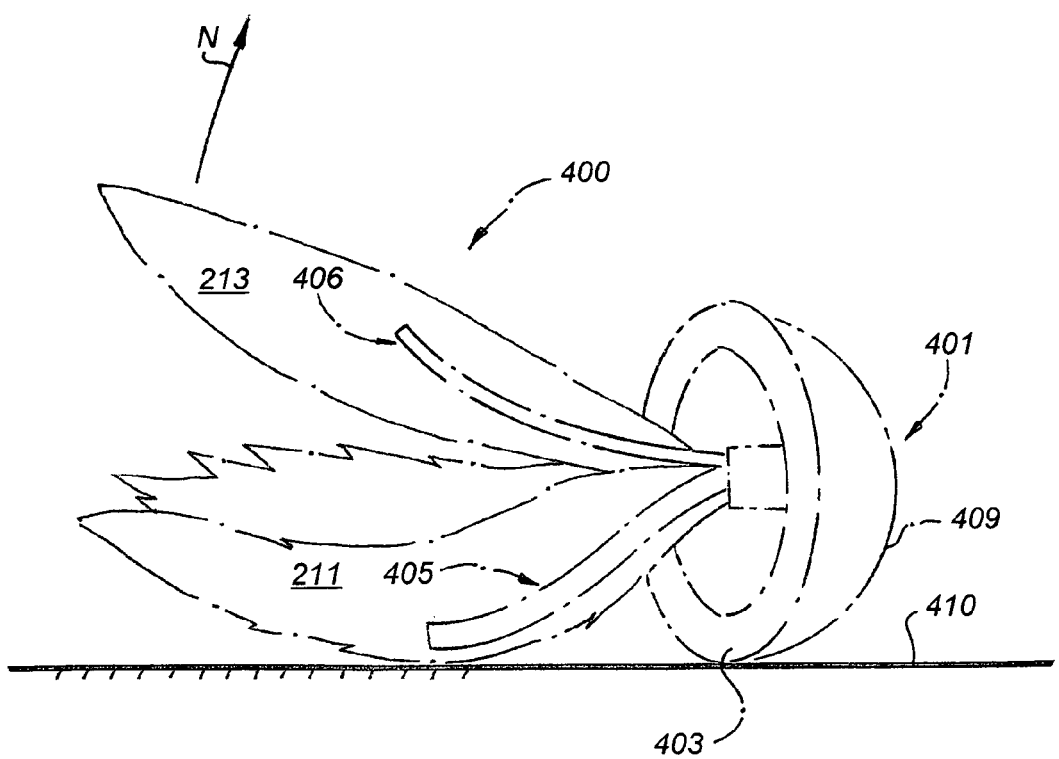
FIG. 44 is a perspective view illustrating the mode of operation of the toy of 37 tipped on edge.

FIGS. 37 to 39, 44 illustrate another cat toy that incorporate the light weight toy of FIG. 27. The toy is generally indicated by reference character 400 and includes an arcuate, open, hollow base 401 having a selected weight, a wall with an inner surface 404 and an outer surface 402, an upper lip 403 connected to the wall, an arcuate bottom 409, and a center of gravity. The base 401 has at least two operative positions, a first upright orientation and a second tipped orientation. The first upright orientation is illustrated in FIG. 37. In the first upright orientation the arcuate bottom 409 contacts the ground or another horizontally oriented support surface and upper lip portion 403 is spaced apart from the support surface. The second tipped orientation is illustrated in FIG. 44. In the second tipped orientation, the base 401 tipped over from the first upright orientation such that the upper lip portion 403 contacts the horizontally support surface 409 and the bottom 409 is spaced apart from the support surface 410. The center of gravity of base 401 is located within base 401 below the upper lip portion 403 when the base is in the upright orientation. The wall of base 401 preferably has a generally equivalent thickness M (FIG. 38) throughout. Hook-and-loop fastening material pieces 407, 408 is mounted on inner surface 404 of the wall of base 401. Pieces 407, 408 can each be hook material or each be loop material or one piece 407 can be hook material and the other piece 408 can be loop material. When toy 400 is placed in the tipped orientation illustrated in FIG.

44, the toy will automatically right itself in the direction of arrow N and, after rocking back-and-forth for a period of time, will return to the stationary upright orientation illustrated in FIG. 37.

Maintaining a low center of gravity in base 401 facilitates the ability of the toy 400 to right itself. One factor contributing to the maintenance of the low center of gravity is the light weight of the plume toy of FIG. 27 that is preferably utilized in base 401. By way of example, and not limitation, the plume toy presently utilized weighs 0.1 ounce while the elastomer base 401 weight 0.5 ounce. The weight of the plume toy or other toy placed in base 401 can vary as desired; however, It is presently preferred that the plume toy weigh 50% less than base 401, and is most preferred that the plume toy weigh less than 25% of base 401. The light weight of the plume toy reduces the likelihood that the plume toy and base combination will injure a cat and increases the ability of a cat to bat the toy.

The material utilized to construct base 401 can vary as desired. In the presently preferred embodiment of the invention, base 401 does not consist of hard plastic or of some other hard rigid material. A pliable, resilient rubber or other elastomer is utilized that readily elastically deforms when compressed in the mouth of a cat, particularly when one section of lip portion 403 is compressed directly toward an opposing spaced apart section of lip portion. The elastomer has a Shore A durometer hardness in the range of 50 to 100, preferably 50 to 80, and most preferably 50 to 70. While a hard pliable, resilient rubber or similar material can be utilized, such is not preferred. However, exemplary results can still be obtained with a relatively hard material as long as the material is pliable and be readily deformed by the mouth of a cat. Base 401 be fabricated from soft polyurethane foam or other soft materials.

The diameter or width M (FIG. 39) of arcuate base 401 can vary. In presently preferred embodiments of the invention, diameter M is often between one inch and four inches. Base 401 is semi-spherical in FIG. 37. Base 401 can take on other arcuate shapes that permit base 401 to rock back-and-forth. For example, base 401 can have an oval shape that produces an outer surface 402 similar to the outer surface of an egg.

The width M (FIG. 38) of the wall of base 401 can vary at different points in base 401. A base 401 with a wall of generally equal thickness at all points is currently preferred for ease of manufacture and aesthetics.

Although not required, the spread of the plume in the toy of FIG. 37 extends, in the manner indicated by arrow J, beyond the periphery of upper lip portion 403. This spread makes it more difficult to completely tip over the toy past the orientation shown in FIG. 44 such that the toy will not self right itself. The number of feathers, of felt or fleece strips or other shape, or of other objects in the plume can, as noted, vary, however a sufficient number of feathers or other objects is preferably utilized to help prevent the toy from tipping completely over to a position in which the toy will not self right. Presently one to fifty feathers or other objects are utilized in a plume when the diameter M of base 401 is one and three-fourths inches. Feathers 211 to 213 and non-fraying members 405 and 406 can be resilient and, when the toy is in the tipped orientation depicted in FIG. 44, can generate forces that tend to push the toy up away from support surface 410 and in the direction of arrow N. The use of strips of felt or fleece is an important embodiment of the invention because felt or fleece do not readily fray and get tangled in the claws of a cat's paws.

Ballast can be added to base 401, or the shape of base 401 can be altered to provide more mass that functions as ballast. One particular advantage of the presently preferred base 401 is that it does not—in part because of the light weight of the plume toy attached to base 401—require ballast or require that the constant width of the wall of base 401 be altered.

An alternate embodiment of the invention is illustrated in FIGS. 45 to 48 and provides the opportunity to reconfigure a cat play toy so that the toy is of interest to the cat for a longer period of time and so that the toy can appeal simultaneously to more than one of the sound, smell, sight, and touch senses of the cat.

Toys that appeal and are adapted to cats normally are not suitable for dogs, in part because dogs in many cases are larger and in all cases do not have the claw structure of a cat.

The construction of the stick 440 and head 441 in FIG. 45 is similar to the construction of the stick 314 and head 316, 309, 310 illustrated in FIGS. 31 to 33. Head 441 includes tapered member 442 attached to the upper end of stick 440. The material utilized to fabricate member 442 and stick 440 can vary as desired but is presently preferably a polymer. Stick 440 can be rigid but is preferably elastic such that when handle end 446 is held in fixed position, the upper end of stick 440 and member 442 can be displaced to elastically bend stick 440. After the upper end of stick 440 is bent and released, the stick elastically returns to its original configuration. Some elastic materials like rubber bands and rubber balls experience a significant change in volume when stretched or compressed. Other elastic materials like stick 440 can be bent while experiencing little, if any, change in volume. As used herein, an elastic material is one that generally returns to its original shape and configuration after being bent, compressed, or tensioned.

A pair of equally shaped pieces 443, 444 of hook and of loop VELCRO fastener material, respectively, are provided. Each piece 443, 444 is fastened with adhesive to a different opposing side of head member 442 in the manner illustrated in FIGS. 45 and 46 such that the hook or loop surface of each piece 443, 444 faces outwardly. Other fastening means can be utilized to secure pieces 443, 444 to member 442. If desired, each piece 443, 444 can comprise VELCRO hook fastening material or can comprise VELCRO loop fastening material. The shape and dimension of each piece 443 and 44 can vary as desired, as can the shape and dimension of head 441. Plume toys, including but not limited to those illustrated in FIGS. 27 and 27A and 27B, or other toys are detachably secured to VELCRO pieces 443, 444. Any desired means (including a lash) can be used to secure a toy to an end of stick 440.

Stick 440 includes upper end 445 and lower end 446.

Cat interaction module 450 is mounted on stick 440. Module 450 can be fixedly mounted on stick 440, but preferably is slidably mounted on stick 440 so that module 450 can slide up and down stick 440 and can, if desired, be completely removed from stick 440 by sliding module 450 downwardly over lower end 446.

Figure 47:
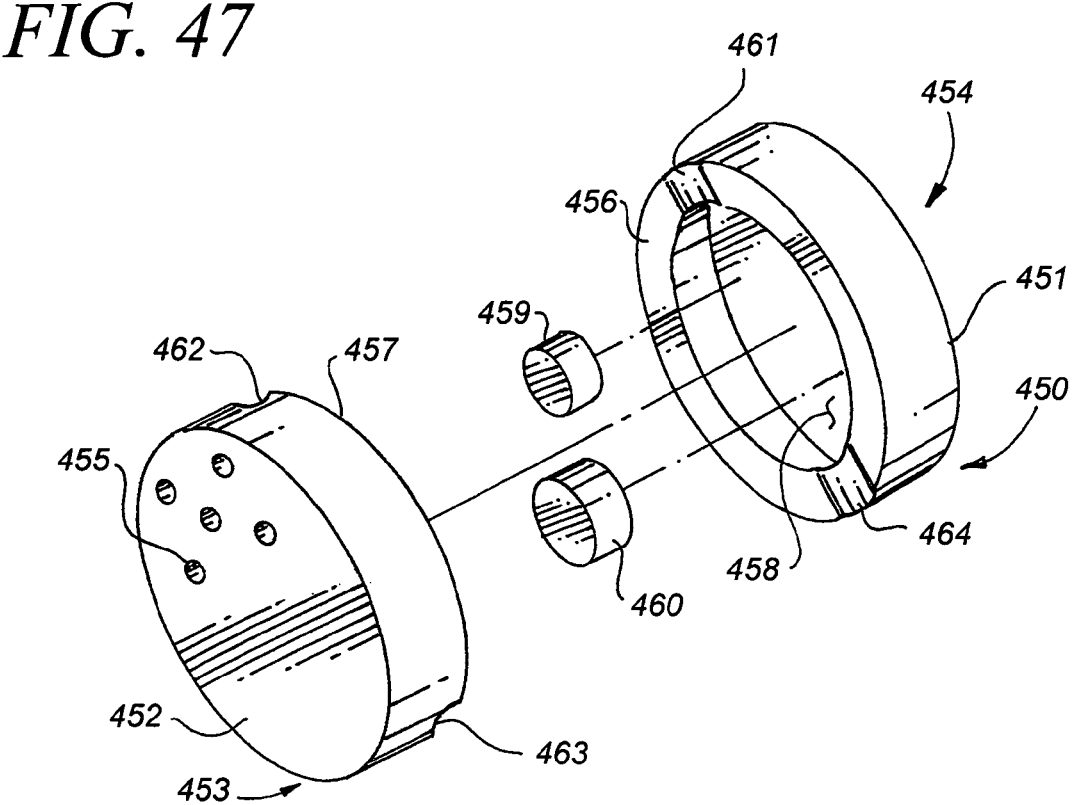
FIG. 47 is an exploded assembly view illustrating the motion sensitive squeaker unit utilized in the invention of FIG. 45.
Figure 48:
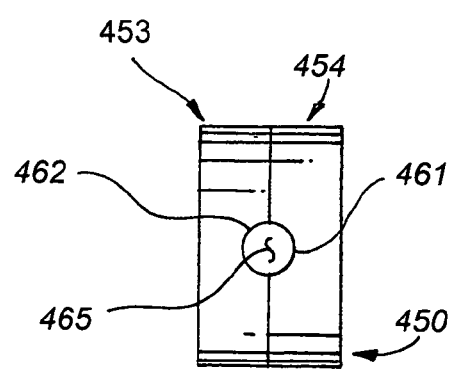
FIG. 48 is a top view illustrating the squeaker unit of FIG. 47 assembled.

While the shape and dimension and construction of module 450 can vary as desired, module 450 presently includes hollow oval halves 454 and 453 fixedly connected by adhesive along flat, opposed, circular edges 456, 457 (FIG. 47). Half 454 includes outer flat oval surface 451. Half 453 includes outer flat oval surface 452. Openings 455 are formed through half 453. Half 454 includes semi-cylindrical apertures 461 and 464. Half 453 includes semi-cylindrical apertures 462 and 463. When halves 453 and 454 are joined together in the configuration illustrated in FIGS. 45, 46, and 48, semi-cylindrical apertures 462 and 461 form cylindrical opening 465 (FIG. 48) extending through the outer wall of unit 450. When halves 453 and 454 are joined together in the configuration illustrated in FIGS. 45, 46, and 48, semi-cylindrical apertures 463 and 464 form a sister cylindrical opening that is equivalent, spaced apart, and opposed to opening 465 such that when module 450 is mounted on stick 440, stick 440 slidably extends through said cylindrical opening 465, through said sister opening, and through unit 450 in the manner illustrated in FIGS. 45 and 46. The outer diameter of stick 440 is slightly less than the inner diameter of openings 465 so that unit 450 can slid along stick 440. If desired, unit 450 can be fixedly mounted at any position along stick 440 or along a lash attached to stick 440.

As is illustrated in FIG. 47, a sound generating unit 459 and a battery 460 are mounted inside of module 450. Battery 460 is in conventional fashion connected to (not shown) and provides the electrical power to operate unit 459.

Unit 459 presently preferably produces sound that emanates out of openings 455. Unit 459 can be activated by any desired means, i.e., by a remote control unit similar to that commonly utilized to turn a television on and off, by a manually operated switch, etc. It is presently preferred, however, that unit 459 be activated by movement of module 450 (and therefore by movement of unit 459). Consequently, when module 450 is moved from one position to another at a predetermined speed or acceleration, a motion sensor in or associated with unit 459 causes unit 459 to produce sound that emanates from a speaker (not shown) in unit 459 and from inside module 450 out through openings 455.

The sound emanating outwardly from openings 455 has a frequency that can be heard by a cat that is within three feet of module 450 and has normal hearing, and has a volume, or loudness, that is sufficiently loud to be heard by a cat that is within three feet of module 450 and has normal hearing.

Once activated by motion, unit 459 can continuously produce sound until turned off, but preferably produces sound only for a selected period of time and then automatically turns off. This period of time can vary as desired, but is presently in the range of about one to five seconds. The sound produced by unit 459 can have only one frequency, i.e., be a monotone. The sound is, however, preferably not a monotone, but comprises changing frequencies. One preferred sound imitates the squeak of a mouse. Another preferred sound imitates the chirp of a bird. A further preferred sound imitates the purring of a cat.

The speed and/or acceleration at which unit 459 (and module 450) must be moved to activate unit 459 can vary as desired, but it is desirable that the speed required be minimal and be slow enough so that a cat is not injured in the event the cat attempts to bat or stop module 450 (or stick 440 or a toy connected to the end of stick 440) with its paw or paws.

The kind of motion required to activate unit 459 can vary as desired, and unit 459 can be constructed so that motion in any direction can be utilized to activate unit 459. It is currently preferred however, that unit 459 only be activated when stick 440 and module 450 are moved laterally in the generally manner indicated by arrows A and B in FIG. 45 and/or when stick 440 and module 450 are rotated simultaneously in the manner indicated by arrows C in FIG. 45. When stick 440 and module 450 are moved in a direction D that is parallel to the longitudinal axis of stick 440, unit 459 is not activated. This is preferred for several reasons.

First, a user has a way to utilize the toy of FIG. 45 without making sound. This is desirable because the cat, or user, may tire of hearing the sound produced by unit 459.

Second, the user has a way to utilize the toy of FIG. 45 to substantially continuously make sound.

Third, the user has a way to reconfigure the toy of FIG. 45 by alternating and varying the motion used to produce sound and by varying the length of time sound is produced. This tends to make it easier to keep a cat interested in playing for a longer period of time. A user may, for example, move stick 440 in the direction D for five seconds, then in the direction of arrow C for one second, then in the direction D for four seconds, then in the direction of arrow C for three seconds, and, finally, in the direction of arrow A for ten seconds.

The direction(s) of movement of module 450 and stick 440 that will activate unit 459 can vary as desired, as can the direction(s) of movement of module 450 and stick 440 that will not activate unit 459.

Dashed line 450A indicates one possible position of module 450 when it is slid toward end 446 of stick 440. When module 450 is in this position, it can function as a handle or part of a handle. Or, if the end 446 is grasped at a point below module 450 in FIG. 45, and stick 440 is manually moved through an arc in the direction of arrow A, the "centrifugal force" acting on module 450 can cause module to slide up stick 440 in the direction of arrow D while at the same time activating unit 459 such that unit 459 produces sound.

As would be appreciated by those of skill in the art, module 450 can be fixedly, slidably, and/or removably mounted and utilized on any desired stick that is utilized in a cat toy, including stick 26 in FIG. 1, stick 130 in FIG. 11, stick 130 in FIG. 20, stick 330 in FIG. 28, and stick 340 in FIG. 29. Module 450 can also be fixedly, slidably, and/or removably mounted on a lash or string like lash or string 126 in FIG. 12 and lash or string 126 in FIG. 20.

The primary function of module 450 is to produce one or more signals that are recognizable by, and hopefully appeal to, one of the senses of a cat. These senses include the sense of sight, of hearing, of smell, of taste, and of touch. The sound produced by unit 459 is an example of producing a signal recognizable by a cat. If a unit 459 when activated produces light that can be seen by the cat, then module 450 is producing a signal (i.e., the light) that is recognizable by the cat. If a unit 459 when activated produces a scent that can be detected by the cat's nose, then module 450 is producing a signal (i.e., the scent) that can be detected by the cat. If a unit 459 when activated produces a small electrical charge that can be felt and therefore detected by the cat's pow, then module 450 is producing a signal (i.e., the electrical current) that can be detected by the cat. If a unit 459 when activated emits or produces a substance that can be tasted or otherwise sensed by the cat's tongue, then module 450 is producing a signal (i.e., the substance) that can be detected by the cat.

Module 450 can be utilized on a stick 440 that does not have a toy attached to the stick and/or does not have a member 442 connected to the upper 445 or lower 446 end of the stick 440.

The toy of FIG. 45 can be utilized by completely removing module 450 from stick 440 and playing with a cat by attaching a toy to the head 441 of the stick and moving the stick 440 and toy attached thereto near the cat.

Figure 49:
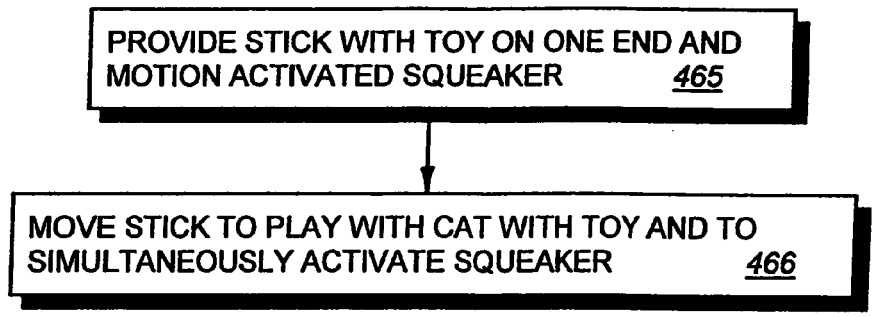
FIG. 49 is a block flow diagram illustrating one method of utilizing the toy of FIG. 45.

The method of the invention illustrated in FIG. 49 comprises the step 465 of providing a stick with a toy on one end and with a motion activated squeaker. The method also includes the step 466 of playing with a cat by moving the stick and toy on the stick near the cat to activate the squeaker while moving the stick.

Figure 50:
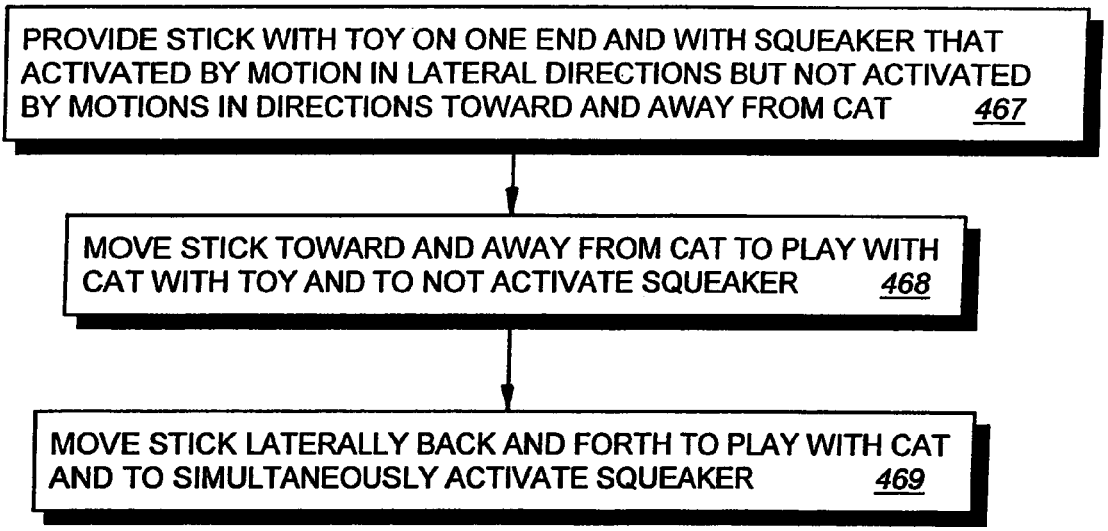
FIG. 50 is a block flow diagram illustrating another method of utilizing the toy of FIG. 45.

The method of the invention illustrated in FIG. 50 includes the step 467 of providing a stick with a toy on one end of the stick and with a squeaker (unit 459) mounted on the stick. The squeaker is activated by motions in lateral directions but is not activated by motions in directions toward and away from a cat. In step 468, the stick is moved toward and away from the cat to play with the cat with the toy while not activating the squeaker. In step 469, the stick is moved laterally back and forth to play with the cat and simultaneously activate the squeaker.

The method of the invention illustrated in FIG. 51 includes the step 470 of providing a motion activated squeaker that slides along a stick. In step 471, the user plays with a cat by moving the stick to simultaneously slide the squeaker along the stick and to activate the squeaker to produce sound.

Figure 52:
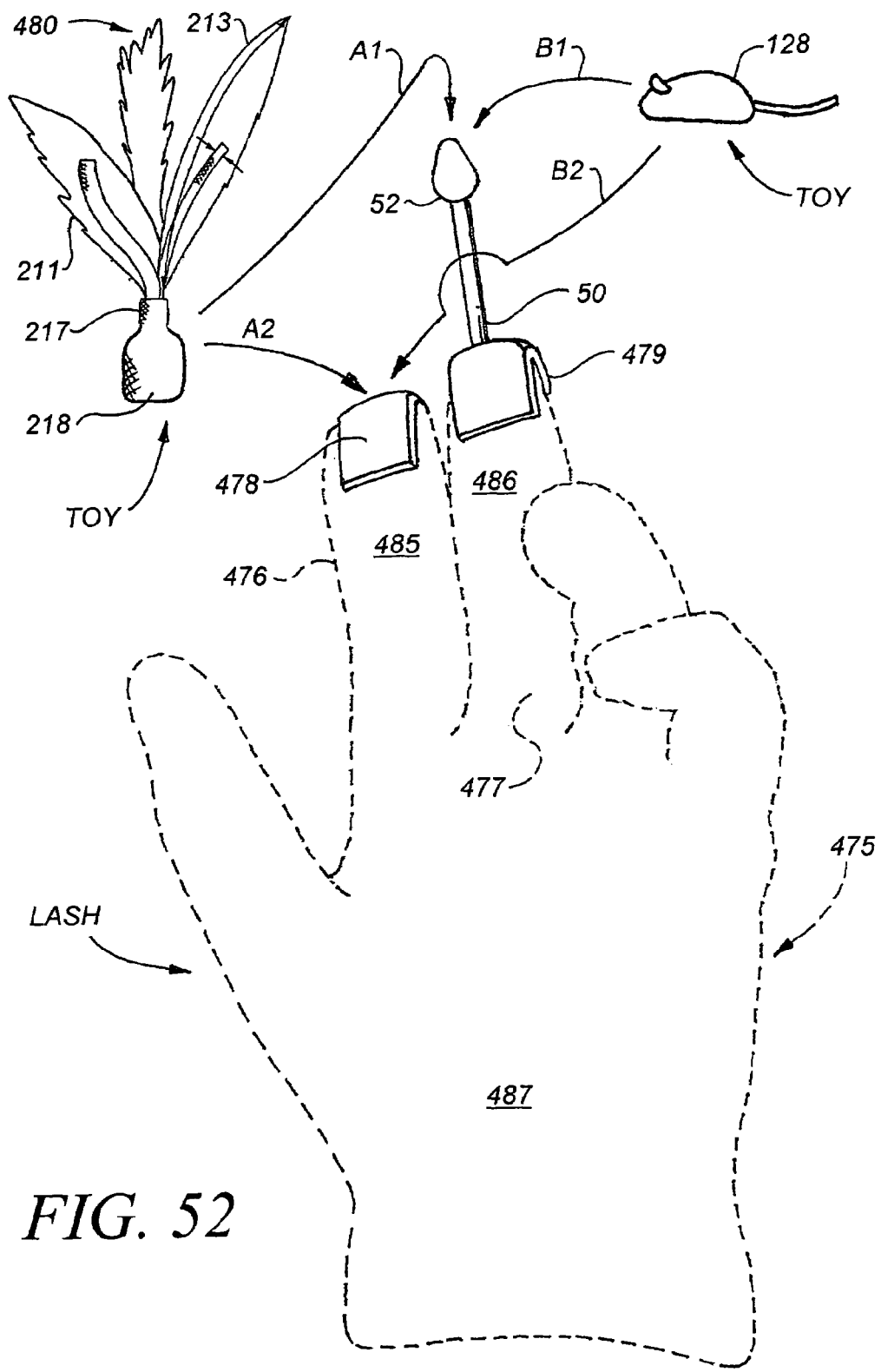
FIG. 52 illustrates another embodiment of the invention in which the lash comprises a glove.

In the embodiment of the invention pictured in FIG. 52, a glove 475 serves as the lash. Glove, or lash, 475 includes a first end 487 (the bottom of glove 475) and a second end 485 or 486 (the tips of finger stalls in glove 475). Any desired toy or toys, including feather teaser 480 (earlier described herein and illustrated in FIG. 27) and mouse 128, can be affixed to end 485 utilizing any desired fastening system. Presently preferred however, is securing a VELCRO® fastener 478 to end 485 (or 486) to detachably engage VELCRO® fastener(s) 219, 229 (not visible in FIG. 52, see FIG. 27) on toy 480. VELCRO® fastener 478 can include a hook portion and a loop portion, can consist completely of hook VELCRO® fastener, or can consist completely of loop VELCRO® fastener—as long as VELCRO® fastener(s) 219, 229 that will oppose and be connected to fastener 478 or to parts of fastener 478 is opposite (i.e., hook material is "opposite" loop material) and will therefore engage fastener 478. For example, if fastener 219 is hook material, then the portion of fastener 478 that is to be connected to fastener 219 must be loop material, and not hook material. Similarly, mouse 128 can include VELCRO® fasteners that will attach to fastener 478. Or, if mouse 128 is made from felt or other appropriate materials, hook VELCRO® fastener may readily engage the felt and removably secure mouse 128 to end 485.

The lower end of shaft 50 is attached to fabric member 479. Member 479 is secured to end 486 of glove 475. The upper end of shaft 50 is connected to wand head 52. Head 52 can comprise or be covered with VELCRO® fastener so toys 480, 128 can be secured to head 52. The VELCRO® fastener on head 52 can include a hook portion and a loop portion, can consist completely of hook VELCRO® fastener, or can consist complete of loop VELCRO® fastener as long as VELCRO® fastener(s) 219, 229 that will oppose and be connected to fastener or to parts of fastener on head 52 is opposite and will therefore engage head 52. For example, if fastener 219 is hook material, then the portion of the VELCRO® fastener on head 52 that is to be connected to fastener 219 must be loop material. Similarly, mouse 128 can include VELCRO® fasteners that will attach to fastener 478. Or, if mouse 128 is made from felt or other appropriate fabric materials, hook VELCRO® fastener may readily engage the felt and removably secure mouse 128 to head 52.

Toy 480 can, as indicated by arrow A2, be mounted on end 485 or can be mounted A1 on end 486. Similarly, toy 128 can be mounted B1 on end 486, or can be mounted B2 on end 483.

Glove 475 can be made from rubber or another polymer or another material(s), but typically is made from a fabric.

Figure 53:
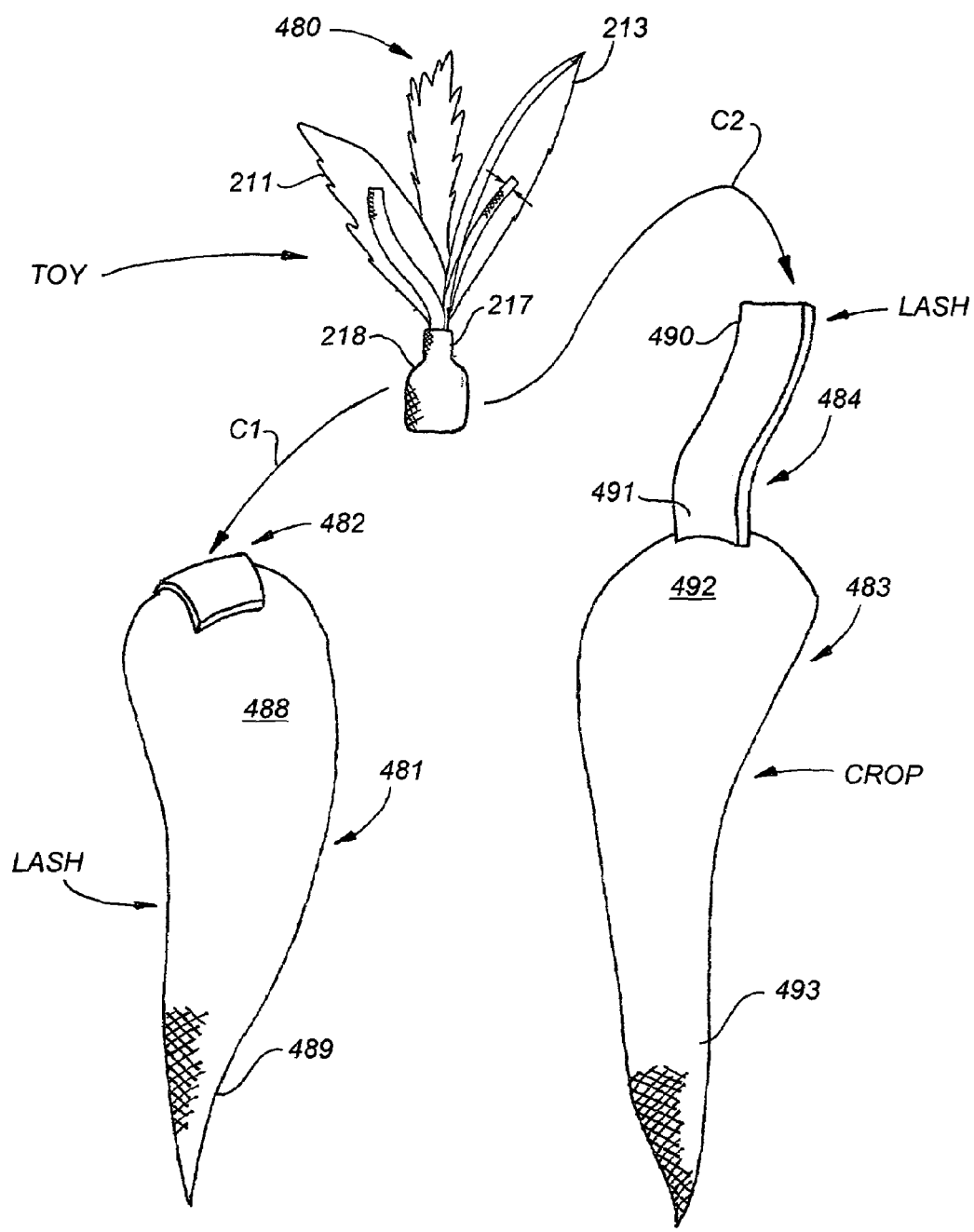
FIG. 53 illustrates still another embodiment of the invention in which the lash is a likeness of a vegetable.

Lash 481 in FIG. 53 can have any desired shape and dimension, but is made in the shape, and preferably the color, of a carrot. Lash 481 includes a lower first end 489 and an upper second end 488. VELCRO® fastener material 482 is secured to end 488. The VELCRO® fastener 482 on end 488 can include a hook portion and a loop portion, can consist completely of hook VELCRO® fastener, or can consist complete of loop VELCRO® fastener—as long as VELCRO® fastener (s) 219, 229 that will oppose and be connected to fastener 478 or to parts of fastener 482 is opposite (i.e., hook material is "opposite" loop material) and will therefore engage fastener 482. For example, if fastener 219 is hook material, then the portion of fastener 482 that is to be connected to fastener 219 must be loop material, and not hook material. Similarly, a mouse 128 or other toy attached to end 488 can include VELCRO® fasteners that will attach to fastener 482. Or, if mouse 128 is made from felt or other appropriate fabric materials, hook VELCRO® fastener 482 may readily engage the felt and removably secure mouse 128 to end 488.

Lash 481 can be made from rubber or another polymer or another material(s), but typically is made from a fabric.

Lash 484 in FIG. 53 includes a lower first end 491 attached to the upper end 492 of crop 483 and includes an upper second end 490. Crop 483 can have any desired shape and dimension, but in the embodiment shown in FIG. 53 is made in the shape, and preferably the color, of a carrot. Lash 484 can be made from any desired material, but in FIG. 53 is comprised of felt such that hook VELCRO® fastener(s) will detachably engage end 490. VELCRO® fastener can, if desired, be secured to end 490 to detachably secure to opposing VELCRO® fastener 219, 229 on a toy 480. As will be appreciated by those of skill in the art, where VELCRO® fastener is utilized herein, snaps or any other desired fastening system can be utilized in place of or in conjunction with the VELCRO® fastener.

Figure 54:
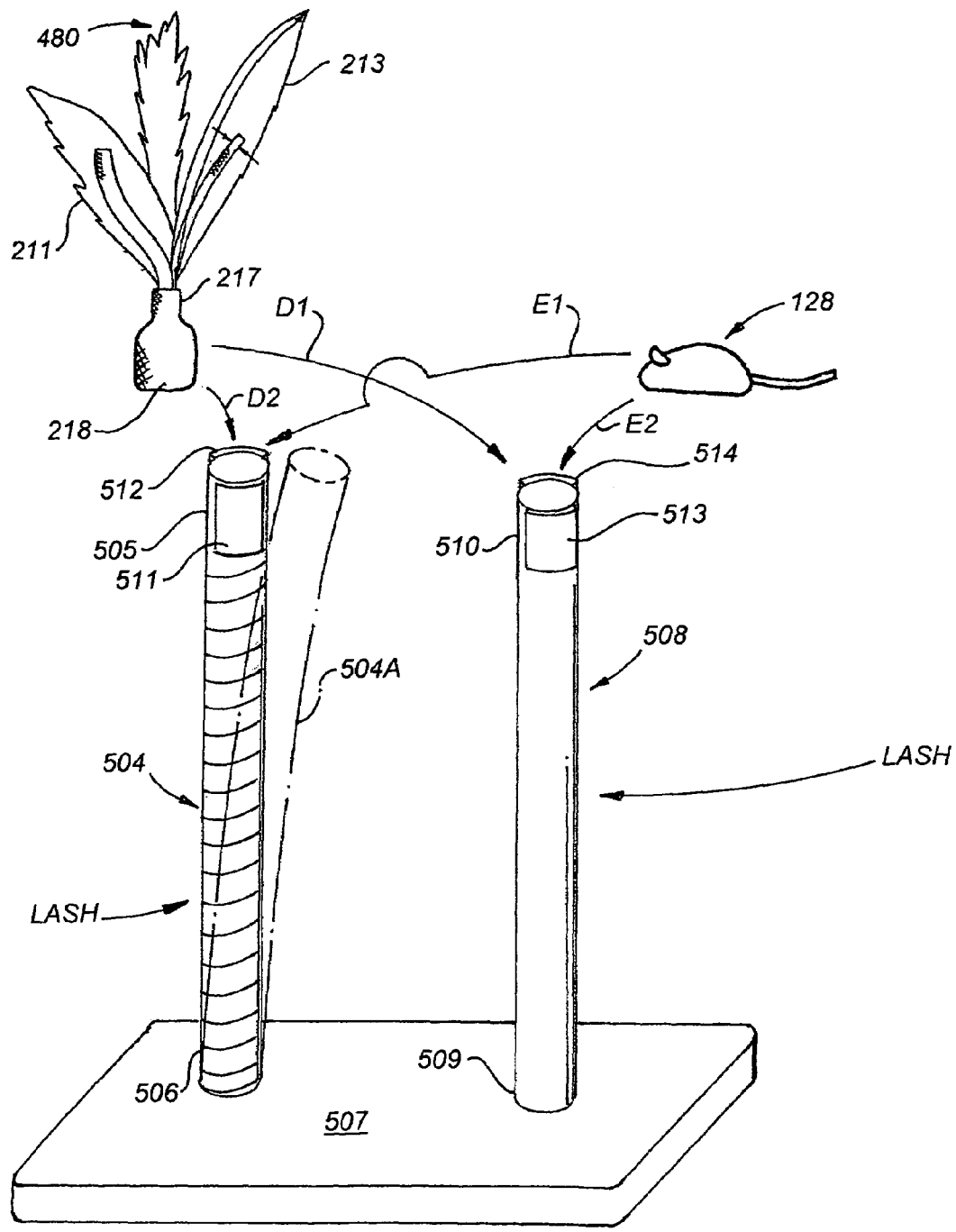
FIG. 54 illustrates yet another embodiment of the invention in which one end of the lash is affixed to a base or ballast.

Lash 504 in FIG. 54 comprises a spring having a first lower end 506 anchored in a base 507 and a second upper end 505. Lash 504 can be resiliently displaced in the manner indicated in FIG. 54, after which the lash 504 returns to the normal vertically oriented position illustrated in FIG. 54. Hook VELCRO® fastener 511 and loop VELCRO® fastener 512 are attached to upper end 505 to receive, as indicated by arrow D2, loop fastener 219 and hook fastener 229 (not visible in FIG. 53, see FIG. 27) on toy 480 or on another toy 128. Or, if mouse 128 is made from felt or other appropriate fabric materials, hook VELCRO® fastener 511 may, when mouse 128 is mounted E1 on end 505, readily engage the felt and removably secure mouse 128 to end 505.

In FIG. 54, elongate lash 508 comprises a rigid polymer rod having a first lower end 509 anchored in a base 507 and having a second upper end 510. Hook VELCRO® fastener 513 and loop VELCRO® fastener 514 are attached to upper end 510 to receive, as indicated by arrow D1, loop fastener 219 and hook fastener 229 (not visible in FIG. 53, see FIG. 27) on a toy 480 or on another toy 128. Or, if mouse 128 is made from felt or other appropriate fabric materials, hook VELCRO® fastener 513 may, when mouse 128 is mounted on end 510, readily engage the felt and removably secure mouse 128 to end 505.

Figures 55, 56:
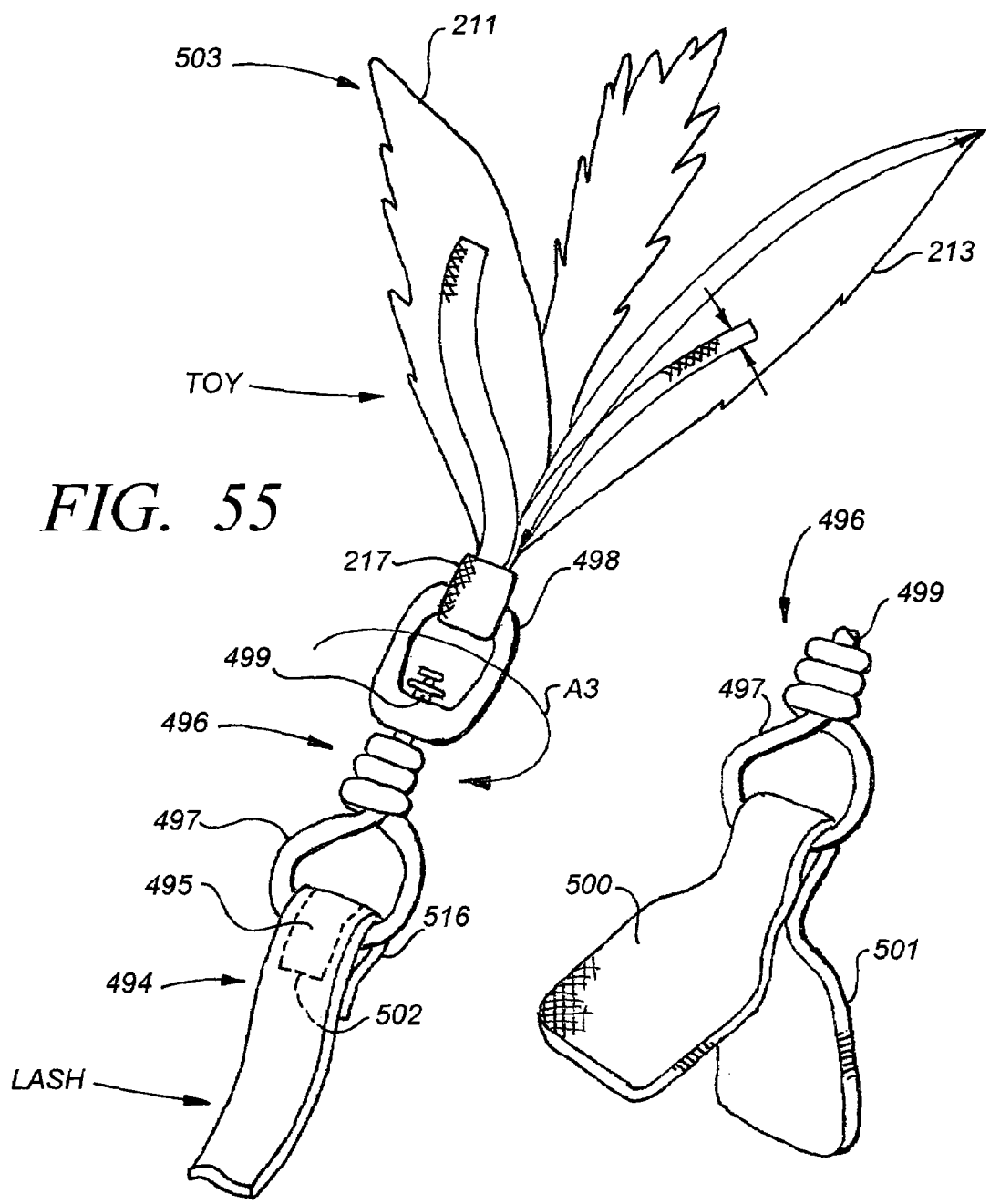
FIG. 55 illustrates still a further embodiment of the invention in which a toy is attached with a swivel to a lash.
FIG. 56 illustrates still another embodiment of the invention in which hook and loop fasteners are secured to one end of a swivel to secure the toy and swivel to a lash.

FIG. 55 illustrates an alternate embodiment of the invention in which a swivel 496 is utilized to attach a toy 503 to a lash 494. Toy 503 is comparable to the toy in FIG. 27, except that felt pieces 215, 225 and the attached VELCRO® fasteners 219, 229 are not included. Instead, lower portion 217 is affixed to eyelet 498 of swivel 496. Pin 499 slidably extends through an aperture (not visible) extending through eyelet 498. The construction of swivel 496 can be comparable to the construction of swivels commonly utilized to secure a fish hook to a fishing line. Eyelet 498 can pivot, or rotate, freely about pin 499 in the directions indicated by arrow A3. End 516 of lash 494 is secured to eyelet 497 of swivel 496. The particular advantage of utilizing swivel 496 to secure toy 503 to a lash 494 is that swivel 496 permits toy 503 to rotate freely in the direction of arrows A3, which produces erratic movement of toy 503 when lash 494 is pulled or snapped or otherwise moved through the air. Feathers 211, 213 are arranged to facilitate such erratic movement, and normally will facilitate such erratic movement because the flow of air and resistance to air flow produced by the feathers are other articles in toy 480 varies because of the shape of the feathers and articles.

When toy 480 is moving through the air, toy 480 will consequently wobble or rotate. The amount and direction of wobble typically will change as toy 480 moves through the air, hence the erratic unpredictable movement and travel of toy 480. In comparison, a spherical object like a tennis ball tends to follow a much more predictable path. The erratic movement of toy 480 more closely simulates the movement of mice and other prey attempting to escape capture by a cat.

As noted, in FIG. 55 toy 503 is comparable to the toy in FIG. 27, except that felt pieces 215, 225 and the attached VELCRO® fasteners 219, 229 are not included. If desired, in an alternate embodiment of the invention one or more VELCRO® fasteners 219, 229 can be included on toy 503 and utilized to detachably secure toy 503 to eyelet 489, or to one or more opposing VELCRO® fasteners 219, 229 that are mounted on eyelet 489. Toy 503 can be detachably secured to eyelet 480 utilizing any desired fastener system.

In FIG. 56, VELCRO® fasteners 500 and 501 are secured to eyelet 497 of swivel 496. Fasteners 500 and 501 can be utilized to attach swivel 496 and toy 503 to fasteners 502 mounted on a lash 494, or, can be utilized to attach swivel 496 to felt or another material that will detachably engage hooks on a VELCRO® fastener. In an alternate embodiment of the invention, one or more fasteners 500 and 501 are attached to lash 494 and detachably engage loop material or other opposing fasteners secured to eyelet 497.

In use of the cat interactive devices of FIGS. 52 to 56, (1) a toy 480, 128, 503 is provided, (2) a fastener 218, 496 is provided for and secured to the toy (if the toy is made from felt, the felt can function as a fastener which engages hook material), (3) a lash 475, 481, 484, 504, 508, 494 is provided, (4) a fastener 478, 50-52-479, 482, 484 (felt fabric functions as a fastener which engages hook material), 516 is provided for and attached to one end of the lash, (5) the fastener on the toy is attached to the fastener on the end of the lash, and (6) the lash is pulled, oscillated, reciprocated, or otherwise moved to displace the toy on the lash to generate interest by and play with a cat.

In FIG. 27, VELCRO® fasteners 219, 229 are attached to the inner sides or surfaces of felt pieces 215, 225. Felt pieces 215, 225 each serve as a backing for the fasteners. As is the case in FIG. 56, VELCRO® fasteners can be utilized without utilizing felt or other materials as a backing for the fasteners.

Having set forth the presently preferred embodiments of our invention in Such terms as to enable those skilled in the art to make and use the invention, I claim:

1. A method to make a pet play apparatus for interactive use with a pet, said method comprising the steps of
   (a) providing a lash having a first end and a second end;
   (b) providing a first hook and loop fastener affixed to said second end of said lash and comprising a least one of a pair consisting of
      (i) a hook part, and
      (ii) a loop part;
   (c) providing a toy;
   (d) providing a second hook and loop fastener affixed to said toy and comprising at least one of a pair consisting of
      (i) a hook part, and
      (ii) a loop part; and
   (e) detachably securing said second hook and loop fastener to said first hook and loop fastener.

2. The method of claim 1 wherein said first and second hook and loop fasteners are made at least in part from fabric.

3. The method of claim 2 wherein said lash is made at least in part from fabric.

4. The method of claim 1 wherein said lash is made at least in part from fabric.

\* \* \* \* \*